(12) United States Patent
Suzuki et al.

(10) Patent No.: US 12,491,846 B2
(45) Date of Patent: Dec. 9, 2025

(54) PEDAL DEVICE

(71) Applicant: DENSO CORPORATION, Kariya (JP)

(72) Inventors: Genki Suzuki, Kariya (JP); Etsugo Yanagida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/911,775

(22) Filed: Oct. 10, 2024

(65) Prior Publication Data

US 2025/0036154 A1    Jan. 30, 2025

Related U.S. Application Data

(63) Continuation of application No. PCT/JP2023/015978, filed on Apr. 21, 2023.

(30) Foreign Application Priority Data

Apr. 29, 2022   (JP) .................................. 2022-075561

(51) Int. Cl.
| | |
|---|---|
| B60T 7/04 | (2006.01) |
| B60T 7/06 | (2006.01) |
| G01L 5/22 | (2006.01) |
| G05G 1/30 | (2008.04) |
| G05G 1/38 | (2008.04) |
| G05G 1/44 | (2008.04) |
| G05G 1/50 | (2008.04) |

(52) U.S. Cl.
CPC ................ B60T 7/042 (2013.01); B60T 7/06 (2013.01); G01L 5/22 (2013.01); G05G 1/38 (2013.01); G05G 1/44 (2013.01); G05G 1/506 (2013.01)

(58) Field of Classification Search
CPC .. G05G 1/30; G05G 1/38; G05G 1/44; G05G 1/483; G05G 1/50; G05G 1/506; G05G 25/00; B60T 7/042; B60T 7/06; B60T 8/17; G01L 5/22
See application file for complete search history.

(56) References Cited

U.S. PATENT DOCUMENTS

| | | | |
|---|---|---|---|
| 10,175,712 B2 * | 1/2019 | Kaijala | B60K 26/04 |
| 10,860,048 B2 * | 12/2020 | Kihara | G01L 1/2287 |
| 10,948,941 B2 * | 3/2021 | Dohmen | B60T 7/06 |

(Continued)

FOREIGN PATENT DOCUMENTS

| | | | | |
|---|---|---|---|---|
| DE | 10306156 A1 * | 8/2004 | | G05G 1/44 |
| DE | 202008008594 U1 * | 10/2008 | | G05G 1/50 |

(Continued)

*Primary Examiner* — Adam D Rogers
(74) *Attorney, Agent, or Firm* — Nixon & Vanderhye P.C.

(57) ABSTRACT

A pedal pad includes a tread portion depressed by a driver, is fixed to a pad holder, and is displaced together with the pad holder with respect to a support when depressed. A load sensor is fixed to the pad holder and detects a pedal effort of the driver acting on the pedal pad. A pedal effort transmission member includes a pressing portion that presses the load sensor to transmit the pedal effort to the load sensor, and is placed between the tread portion and both the load sensor and the pad holder, and pressed by the tread portion. The pedal pad holds the pedal effort transmission member against the pad holder so that the pressing portion is pressed against the load sensor by the elastic deformation of the pedal pad when the depression operation is not performed.

12 Claims, 14 Drawing Sheets

(56) References Cited

U.S. PATENT DOCUMENTS

| | | | |
|---|---|---|---|
| 11,892,866 B2 * | 2/2024 | Vanek | G01D 5/14 |
| 11,953,932 B2 * | 4/2024 | Luu | G05G 1/42 |

FOREIGN PATENT DOCUMENTS

| | | | | |
|---|---|---|---|---|
| DE | 102013106655 A1 | | 1/2015 | |
| DE | 102020205375 A1 | | 10/2021 | |
| DE | 102023203734 A1 | * 10/2024 | | G05G 1/38 |
| WO | WO-2011094877 A1 | * 8/2011 | | G05G 9/047 |
| WO | 2023210236 A1 | | 11/2023 | |
| WO | 2023210237 A1 | | 11/2023 | |
| WO | 2023210601 A1 | | 11/2023 | |
| WO | 2023210602 A1 | | 11/2023 | |
| WO | 2023210766 A1 | | 11/2023 | |
| WO | 2023210806 A1 | | 11/2023 | |
| WO | 2023210807 A1 | | 11/2023 | |
| WO | 2023210808 A1 | | 11/2023 | |
| WO | 2023210809 A1 | | 11/2023 | |

* cited by examiner

PEDAL DEVICE

CROSS REFERENCE TO RELATED APPLICATION

The present application is a continuation application of International Patent Application No. PCT/JP2023/015978 filed on Apr. 21, 2023, which designated the U.S. and claims the benefit of priority from Japanese Patent Application 2022-75561 filed on Apr. 29, 2022. The entire disclosures of all of the above applications are incorporated herein by reference.

TECHNICAL FIELD

The present disclosure relates to a pedal device.

BACKGROUND

Conventionally, a pedal device has been provided in a vehicle.

SUMMARY

According to an aspect of the present disclosure, a pedal device is to be provided in a vehicle. The pedal device comprises: a support to be fixed to a vehicle body; a pedal body including a pad holder and operatively coupled to the support; and a pedal pad including a tread portion to be depressed by a driver by a depression operation of the driver.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
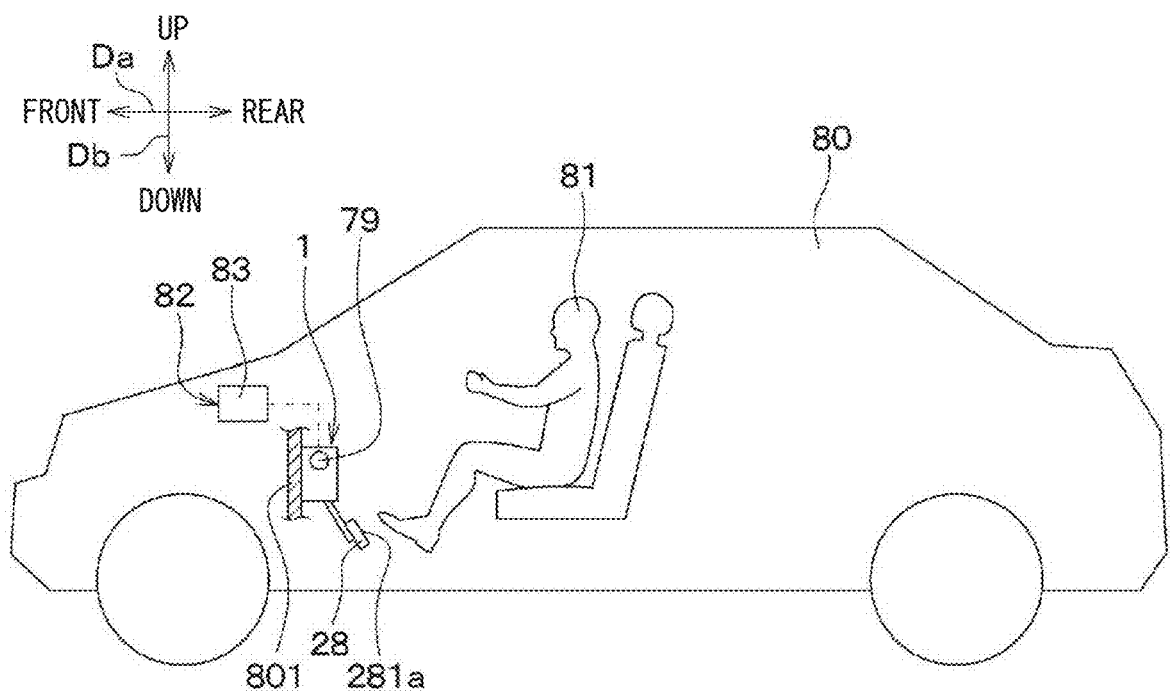
FIG. 1 is a schematic diagram illustrating a vehicle on which a pedal device is mounted in a first embodiment.

Hereinafter, examples of the present disclosure will be described.

According to an example of the present disclosure, a pedal device includes a pedal on which a tread to be depressed by an operator is formed, and a reaction force generation device that generates a reaction force against a pedal effort acting on the pedal.

The pedal includes a pedal bracket coupled to the reaction force generation device, a pedal plate placed between the pedal bracket and the tread of the pedal, and a load sensor fixed to the pedal bracket to detect a pedal effort. The load sensor is placed inside the pedal bracket, and a pressing portion of the pedal plate abuts on the load sensor.

In the pedal device having the load sensor, it is necessary to cause a pressing portion of a pedal plate to abut on the load sensor in a non-depression state where an operator does not perform a depression operation on the pedal. In an actual product, dimensions of components of the pedal device may vary within the tolerance range.

Therefore, in the pedal device, it would be necessary to perform, for each product, clearance adjustment of causing the pressing portion of the pedal plate to abut on the load sensor in the non-depression state of the pedal, based on the workmanship of the individual components such as a pedal bracket and a pedal plate. For example, in the pedal device, the clearance adjustment may be performed by increasing or reducing the engagement length of a screw. Due to the necessity of performing such clearance adjustment, man-hours may increase in the manufacturing process of manufacturing the pedal device. As a result of detailed studies by the inventors, the above has been found.

According to an example of the present disclosure, a pedal device is to be provided in a vehicle. The pedal device comprises:

a support to be fixed to a vehicle body;
a pedal body including a pad holder and operatively coupled to the support;
a pedal pad including a tread portion to be depressed by a driver by a depression operation of the driver, the pedal pad affixed to the pad holder, including an elastically deformable elastic material, and to be displaced together with the pad holder with respect to the support by the depression operation;

a load sensor fixed to the pad holder and configured to detect a pedal effort of the driver acting on the pedal pad in response to the depression operation; and a pedal effort transmission member including a pressing portion pressing the load sensor to transmit the pedal effort to the load sensor, the pedal effort transmission member placed between the tread portion and both the load sensor and the pad holder to be pressed by the tread portion.

The pedal pad holds the pedal effort transmission member against the pad holder so as to cause the pressing portion to be pressed against the load sensor by elastic deformation of the pedal pad when the depression operation is not performed.

In this configuration, the elastic deformation of the pedal pad can absorb dimensional variations of components such as the pad holder and the pedal effort transmission member, and the pressing portion can be brought into contact with the load sensor in a non-depression state where the depression operation is not performed. As a result, adjustment for each product for bringing the pressing portion into contact with the load sensor is unnecessary. This is achieved with a simple structure since the elastic deformation of the pedal pad is used.

Hereinafter, each embodiment will be described with reference to the drawings. In each of the following embodiments, the same or equivalent parts are denoted by the same reference numerals in the drawings.

FIRST EMBODIMENT

As illustrated in FIG. 1, a pedal device 1 of the present embodiment is a device mounted on a vehicle 80, and is subjected to a depression operation with a pedal effort Fp (see FIG. 3) of a driver 81 who is an occupant of the vehicle 80. That is, the driver 81 is an operator who operates the pedal device 1. The pedal device 1 is provided in the vehicle 80 as a brake pedal device for performing a braking operation of braking the vehicle 80.

Specifically, a brake-by-wire system 82 is adopted in the vehicle 80 of FIG. 1, and the pedal device 1 is a brake pedal device used in the brake-by-wire system 82 and constitutes a part of the brake-by-wire system 82. The brake-by-wire system 82 is a system that drives a brake pad of each wheel via a brake circuit by a fluid pressure generated in a master cylinder by the drive control of an electronic control unit 83 mounted on the vehicle 80 on the basis of an electrical signal output from the pedal device 1.

Each of double-ended arrows in FIG. 1 indicates a direction of the vehicle 80 on which the pedal device 1 is mounted. That is, in FIG. 1, a vehicle front-rear direction Da, which is the front-rear direction of the vehicle 80, and a vehicle up-down direction Db, which is the vertical direction of the vehicle 80 (in other words, the top-bottom direction of the vehicle 80), are indicated by the double-ended arrows. Furthermore, in FIG. 5 to be described later, a vehicle left-right direction Dc, which is the left-right direction of the vehicle 80, is indicated by a double-ended arrow. These directions Da, Db, and Dc are directions crossing each other, and specifically, directions perpendicular to each other.

In the description of the present embodiment, the front in the vehicle front-rear direction Da is also referred to as "front of the vehicle", the rear in the vehicle front-rear direction Da is also referred to as "rear of the vehicle", the upward in the vehicle up-down direction Db is also referred to as "upward of the vehicle", and the downward in the vehicle up-down direction Db is also referred to as "downward of the vehicle". The right side in the vehicle left-right direction Dc (in other words, in the vehicle width direction Dc,) is also referred to as "right side of the vehicle", and the left side in the vehicle left-right direction Dc is also referred to as "left side of the vehicle".

Figure 2:
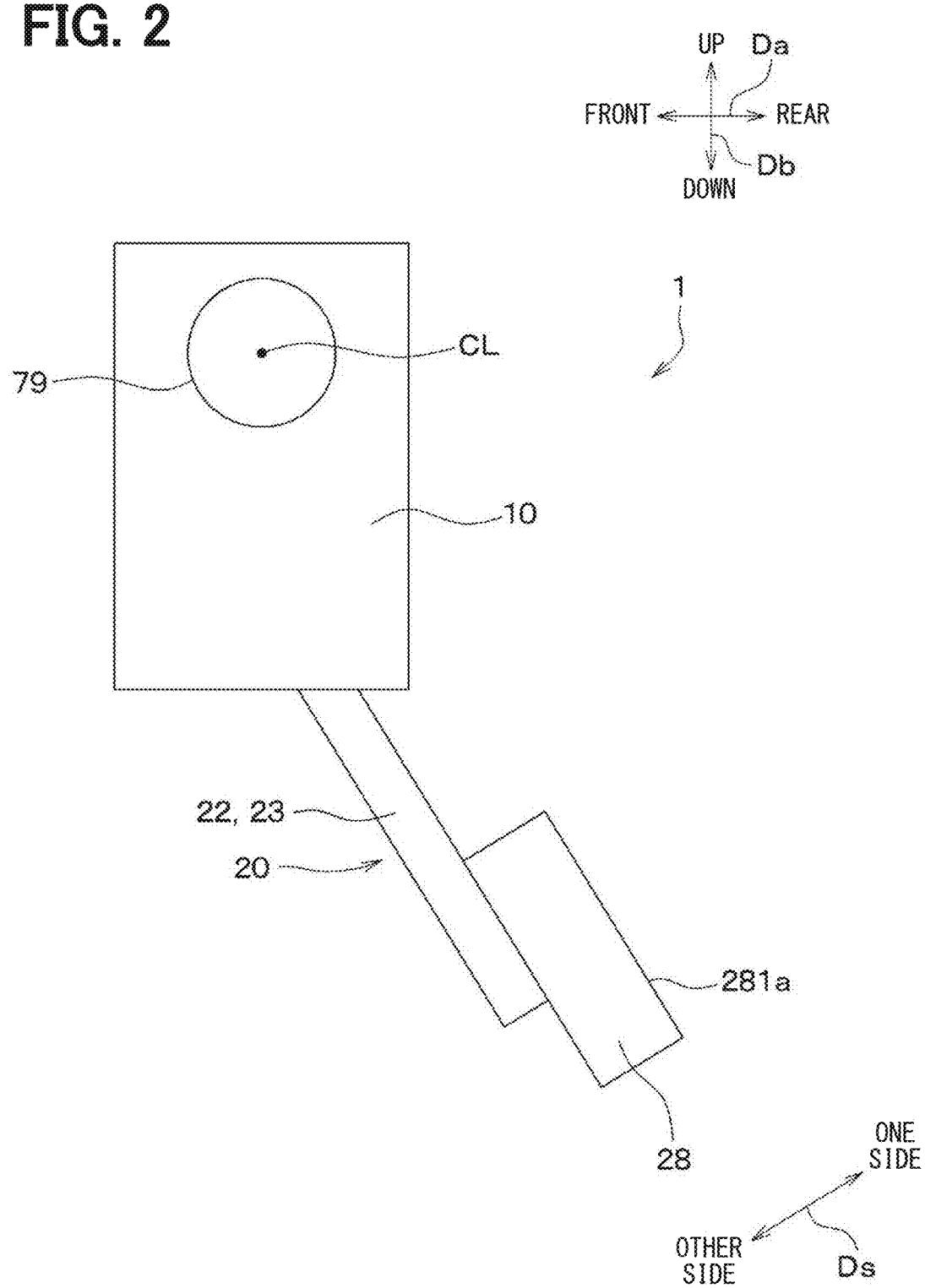
FIG. 2 is an external view illustrating the pedal device of the first embodiment.
Figure 3:
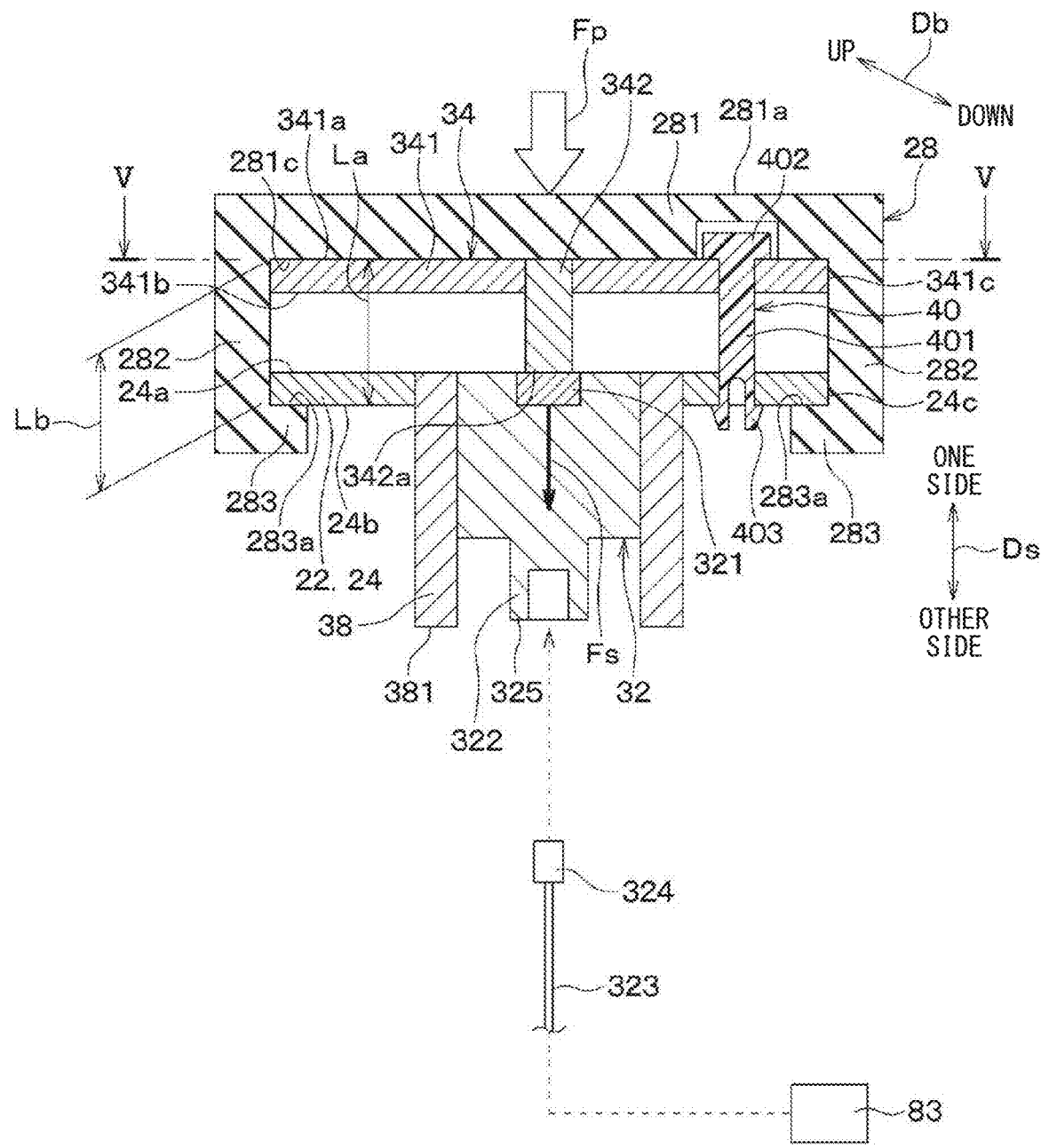
FIG. 3 is a cross-sectional view schematically illustrating a portion of the pedal device of the first embodiment in which a pedal pad is provided in a cross-section perpendicular to a pedal axis, that is, a cross-sectional view displayed in the same direction as that of FIG. 2.
Figure 4:
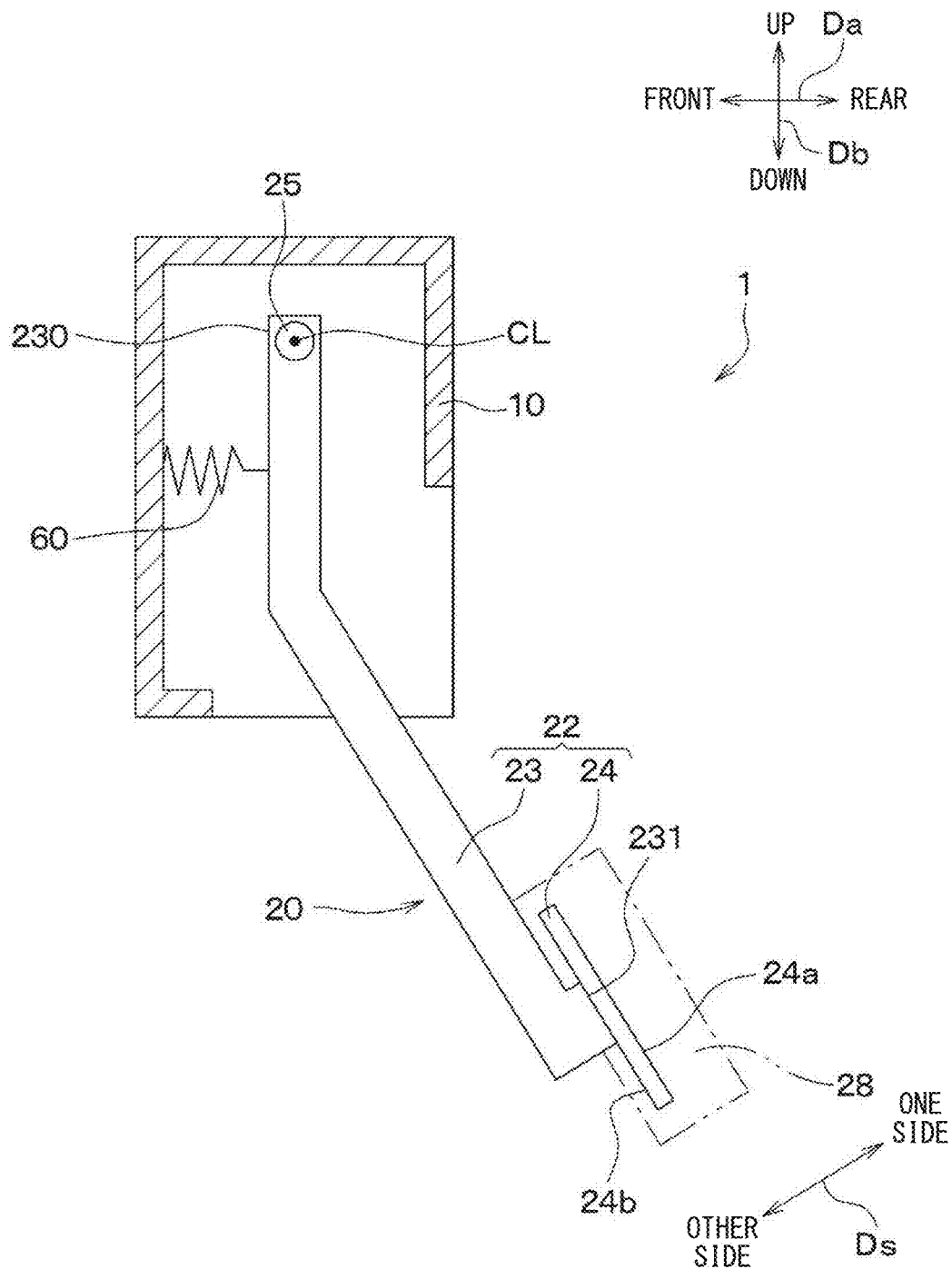
FIG. 4 is a schematic diagram illustrating a housing of the pedal device in a cross-section and illustrating an arm portion and a pad holder of a pedal body in the first embodiment.

As illustrated in FIGS. 2 to 4, the pedal device 1 includes a housing 10, a pedal moving body 20, a reaction force generation mechanism 60, a rotation angle sensor 79, and the like. The pedal device 1 of the present embodiment is a suspended pedal device.

The suspended pedal device 1 is configured in a manner that a portion (specifically, a pedal pad 28) depressed by the driver 81 is placed downward of the vehicle with respect to a swing center CL of the pedal moving body 20 swinging with the depression operation of the driver 81. In the suspended pedal device 1, as the pedal effort Fp (see FIG. 3) of the driver 81 acting on the pedal pad 28 increases, the pedal moving body 20 swings to displace the pedal pad 28 forward of the vehicle.

The swing center CL of the pedal moving body 20 is a uniaxial center as the rotation center in the swing operation of the pedal moving body 20. In the description of the present embodiment, the swing center CL of the pedal moving body 20 is also referred to as "pedal axis CL". The pedal axis CL is represented by a straight line extending along the vehicle left-right direction Dc.

As illustrated in FIGS. 1, 2, and 4, the housing 10 is fixed to a part of a vehicle body 801 of the vehicle 80 by bolting or the like. That is, the housing 10 is a non-rotating member that is fixed to the vehicle body 801 and does not rotate. The housing 10 functions as a support that operatively supports the pedal moving body 20 and the reaction force generation mechanism 60.

An internal space is formed inside the housing 10, the reaction force generation mechanism 60 is housed in the internal space of the housing 10, and a part of the pedal moving body 20 is inserted into the internal space.

The pedal moving body 20 is coupled to the housing 10 so as to be swingable about the pedal axis CL. Specifically, as illustrated in FIGS. 2 to 4, the pedal moving body 20 includes a pedal body 22, a rotating shaft 25, the pedal pad 28, a load sensor 32, a pedal effort transmission member 34, a sensor guide 38, a plurality of pins 40, and the like. That is, the pedal body 22, the rotating shaft 25, the pedal pad 28, the load sensor 32, the pedal effort transmission member 34, the sensor guide 38, and the plurality of pins 40 swing about the pedal axis CL with respect to the housing 10 in response to the depression operation of the driver 81 on the pedal pad 28. In FIG. 3, an arm portion 23 of the pedal body 22 is not illustrated.

As illustrated in FIGS. 2 to 4, the pedal body 22 includes the arm portion 23 and a pad holder 24. The arm portion 23 and the pad holder 24 are integrally formed by bolting, welding, or the like. The arm portion 23 has a shape extending in a direction perpendicular to the pedal axis CL, and includes a proximal end portion 230 provided on the side of the pedal axis CL and a distal end portion 231 located downward of the vehicle or obliquely downward of the vehicle with respect to the proximal end portion 230. In FIG. 4, the pedal pad 28 is represented by a two-dot chain line as an imaginary line.

The proximal end portion 230 of the arm portion 23 of the pedal body 22 is placed in the housing 10. For example, in the housing 10, the rotating shaft 25 formed about the pedal axis CL is inserted into the proximal end portion 230 of the arm portion 23, so that the pedal body 22 is swingably coupled to the housing 10 via the rotating shaft 25.

FIGS. 2 and 4 illustrate the pedal device 1 in a case where the pedal pad 28 is in a non-depression state (in other words, a released state). The non-depression state of the pedal pad 28 is a state where the driver 81 does not perform the depression operation on the pedal pad 28.

Figure 5:
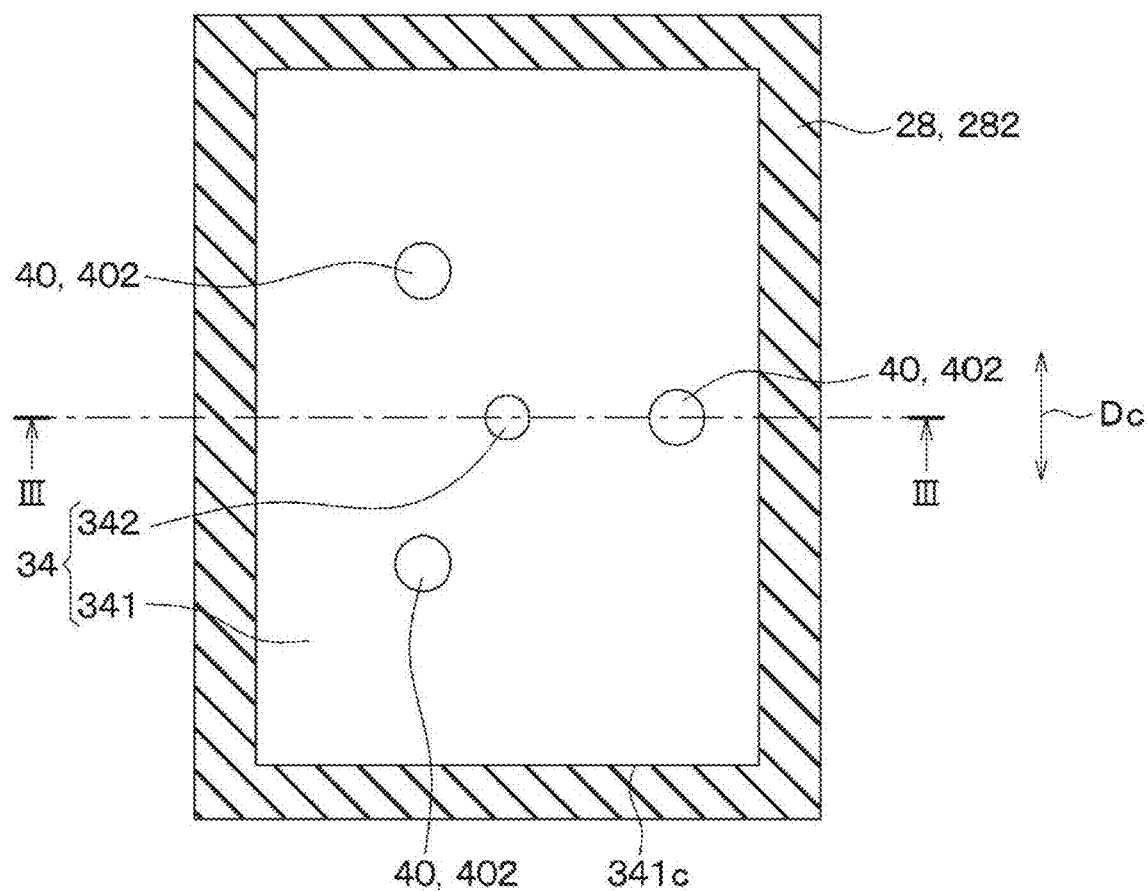
FIG. 5 is a cross-sectional view taken along line V-V of FIG. 3 in the first embodiment.

As illustrated in FIGS. 3 to 5, the pad holder 24 is fixed to the distal end portion 231 of the arm portion 23 by, for example, bolting or welding. The pad holder 24 has a flat plate shape extending with a predetermined load detection direction Ds as a thickness direction. The load detection direction Ds is a direction parallel to the direction of a load Fs detected by the load sensor 32. The load detection direction Ds is a direction perpendicular to the pedal axis CL (in other words, a direction perpendicular to the axial direction of the pedal axis CL), and corresponds to one direction of the present disclosure.

The pad holder 24 includes one surface 24a formed on one side in the load detection direction Ds and the other surface 24b formed on the other side in the load detection direction Ds. In FIG. 5, the pedal pad 28 is illustrated in cross-section for easy illustration, but other components are not illustrated in cross section. FIG. 3 illustrates a cross-section taken along line III-III in FIG. 5.

As illustrated in FIGS. 2 to 4, the pedal pad 28 is a component that is depressed by the driver 81 by the depression operation of the driver 81, and is fixed to the pad holder 24 of the pedal body 22 so as to cover the pad holder 24. The pedal pad 28 is formed of an elastically deformable elastic material. For example, the elastic material constituting the pedal pad 28 is rubber, and the entire pedal pad 28 is formed of rubber.

As described above, the pedal body 22 swings about the pedal axis CL with respect to the housing 10 in response to the depression operation of the driver 81. Therefore, the pedal pad 28 is displaced together with the pad holder 24 with respect to the housing 10 by the depression operation of the driver 81. Specifically, the pedal pad 28 and the pad holder 24 are displaced in the circumferential direction around the pedal axis CL with respect to the housing 10.

As illustrated in FIGS. 3 and 5, the internal space in which the pad holder 24, the pedal effort transmission member 34, and a plurality of pins 40 are arranged is formed inside the pedal pad 28. In the internal space of the pedal pad 28, one side of the load detection direction Ds is closed, and the other side of the load detection direction Ds is opened. The pedal pad 28 includes a tread 281a depressed by the driver 81 from one side in the load detection direction Ds on one side in the load detection direction Ds.

As illustrated in FIGS. 2 and 4, when the driver 81 does not perform the depression operation, one side in the load detection direction Ds is directed obliquely upward of the vehicle and obliquely rearward of the vehicle, and the other side in the load detection direction Ds is directed obliquely downward of the vehicle and obliquely frontward of the vehicle.

As illustrated in FIGS. 3 and 5, the pedal pad 28 includes a tread portion 281, an outer peripheral portion 282, and an other-side protrusion 283. The tread portion 281, the outer peripheral portion 282, and the other-side protrusion 283 are integrally formed, and are integrally molded with rubber, for example.

The tread portion 281 of the pedal pad 28 is placed on one side in the load detection direction Ds of the pedal effort transmission member 34. The tread portion 281 includes the tread 281a of the pedal pad 28, and the tread 281a is formed as an outer surface facing one side in the load detection direction Ds.

The tread 281a of the pedal pad 28 has a planar shape facing one side in the load detection direction Ds, in other words, a planar shape with the load detection direction Ds as a normal direction.

In addition, the tread portion 281 of the pedal pad 28 includes a tread portion inner surface 281c formed on the side opposite to the side of the tread 281a, that is, on the other side in the load detection direction Ds. The tread portion inner surface 281c faces the other side in load detection direction Ds and is in contact with the pedal effort transmission member 34.

As illustrated in FIGS. 3 and 5, the outer peripheral portion 282 of the pedal pad 28 has a tubular shape extending from the peripheral edge portion of the tread portion 281 to the other side in the load detection direction Ds. The outer peripheral portion 282 is formed so as to surround the pedal effort transmission member 34 and the pad holder 24. For example, a base plate 341 of the pedal effort transmission member 34 and the pad holder 24 are fitted inside the outer peripheral portion 282.

When viewed in a direction along the load detection direction Ds, the pad holder 24, the load sensor 32, the pedal effort transmission member 34, the sensor guide 38, and the plurality of pins 40 are arranged inside the outer peripheral portion 282 of the pedal pad 28.

The other-side protrusion 283 of the pedal pad 28 is provided on the other side in the load detection direction Ds of the pad holder 24, and protrudes from the outer peripheral portion 282 to the inside of the outer peripheral portion 282. In addition, the other-side protrusion 283 includes one surface 283a formed on one side in the load detection direction Ds. The one surface 283a of the other-side protrusion 283 faces the other surface 24b of the pad holder 24 in the load detection direction Ds and is in contact with the other surface of the pad holder 24 from the other side in the load detection direction Ds, and is pressed in the load detection direction Ds by the other surface 24b of the pad holder 24.

For example, the other-side protrusion 283 is provided over the entire peripheral edge 24c of the pad holder 24. In other words, the other-side protrusion 283 is provided over the entire circumference around the load sensor 32 as viewed in the direction along the load detection direction Ds.

The load sensor 32 detects the pedal effort Fp of the driver 81 depressing the tread 281a of the pedal pad 28. In other words, the load sensor 32 detects the pedal effort Fp of the driver 81 acting on the pedal pad 28 in response to the depression operation of the driver 81 on the pedal pad 28. The load sensor 32 then outputs an electrical signal indicating the magnitude of the pedal effort Fp of the driver 81 to the electronic control unit 83 (see FIG. 1).

As the load sensor 32 of the present embodiment, for example, a piezoelectric load sensor, a capacitive load sensor, or the like can be adopted. Specifically, the load sensor 32 detects the load Fs as the pedal effort Fp acting on the load sensor 32 from one side in the load detection direction Ds.

The load sensor 32 is fixed to the pad holder 24 of the pedal body 22 via the sensor guide 38. The load sensor 32 is placed inside the outer peripheral portion 282 of the pedal pad 28 as viewed in the direction along the load detection direction Ds.

Specifically, the load sensor 32 includes a sensor detector 321 on which the load Fs detected by the load sensor 32 acts.

That is, the load Fs detected by the load sensor 32 is a load Fs applied to the sensor detector 321, and the load sensor 32 converts the load Fs applied to the sensor detector 321 into an electrical signal and outputs the electrical signal.

The load sensor 32 also includes a connector 322 for electrical connection in addition to the sensor detector 321. In the load sensor 32, the sensor detector 321 is provided on one side in the load detection direction Ds, and the connector 322 is provided on the other side in the load detection direction Ds. The connector 322 is formed to face the other side in the load detection direction Ds. In other words, the connector 322 is opened to the other side in the load detection direction Ds.

A cable connector 324 provided at the distal end of a cable bundle 323 connected to the load sensor 32 is fitted into and electrically connected to the connector 322 of the load sensor 32. That is, the cable connector 324 is inserted into the connector 322 of the load sensor 32 from the other side in the load detection direction Ds, thereby being electrically connected to the connector 322 of the load sensor 32.

The cable bundle 323 coupled to the cable connector 324 electrically connects the load sensor 32 and the electronic control unit 83. For example, the cable bundle 323 includes a plurality of cables such as a cable for transmitting an electrical signal of the load sensor 32 and a cable for supplying power to the load sensor 32.

The load sensor 32 also includes a sensor other end portion 325 placed on the other side in the load detection direction Ds of the load sensor 32. The sensor other end portion 325 is also a connector distal end portion located on the other side in the load detection direction Ds of the connector 322 of the load sensor 32.

As illustrated in FIGS. 3 and 5, the pedal effort transmission member 34 transmits the pedal effort Fp of the driver 81 applied to the tread 281a of the pedal pad 28 to the load sensor 32. That is, the pedal effort Fp of the driver 81 is transmitted from the tread portion 281 of the pedal pad 28 to the sensor detector 321 of the load sensor 32 via the pedal effort transmission member 34.

The pedal effort transmission member 34 is placed inside the pedal pad 28. The pedal effort transmission member 34 is placed on one side in the load detection direction Ds of the pad holder 24, the load sensor 32, and the sensor guide 38. That is, the pedal effort transmission member 34 is placed between each of the pad holder 24, the load sensor 32, and the sensor guide 38 and the tread portion 281 of the pedal pad 28.

The pedal effort transmission member 34 includes the base plate 341 and a pressing portion 342. The base plate 341 and the pressing portion 342 are formed of, for example, metal which is hardly bent. In short, the base plate 341 and the pressing portion 342 are formed of a material with higher rigidity than the pedal pad 28, and are less likely to bend than the pedal pad 28.

The base plate 341 has a flat plate shape extending with the load detection direction Ds as a thickness direction. The base plate 341 includes one surface 341a formed on one side in the load detection direction Ds and facing one side in the load detection direction Ds, and the other surface 341b formed on the other side in the load detection direction Ds and facing the other side in the load detection direction Ds.

For example, when viewed in the direction along the load detection direction Ds, the peripheral edge shape of the base plate 341 is the same as the peripheral edge shape of the pad holder 24 of the pedal body 22. That is, the base plate 341 has a shape that does not protrude outward from the peripheral edge 24c of the pad holder 24 as viewed in the direction along the load detection direction Ds.

One surface 341a of the base plate 341 faces and is in contact with the tread portion inner surface 281c of the pedal pad 28 in the load detection direction Ds, and is pressed in the load detection direction Ds by the tread portion inner surface 281c. For example, the tread portion inner surface 281c of the pedal pad 28 is in contact with the entire one surface 341a or substantially the entire one surface 341a of the base plate 341 except for a portion in which the pin 40 is placed.

The pressing portion 342 presses the sensor detector 321 of the load sensor 32 toward the other side in the load detection direction Ds, thereby transmitting the pedal effort Fp of the driver 81 received from the pedal pad 28 to the load sensor 32. For example, in the pedal effort transmission member 34, the pressing portion 342 is fitted into a through-hole formed in the base plate 341, and is integrally fixed to the base plate 341 by welding, press-fitting, or the like.

The pressing portion 342 is formed so as to protrude from the other surface 341b of the base plate 341 to the other side in the load detection direction Ds. The pressing portion 342 includes a pressing surface 342a facing and being in contact with the sensor detector 321 of the load sensor 32 on the other side in the load detection direction Ds.

For example, the pressing portion 342 is also exposed to one side in the load detection direction Ds in the pedal effort transmission member 34. Therefore, the tread portion inner surface 281c of the pedal pad 28 is in contact with not only one surface 341a of the base plate 341 but also the pressing portion 342 from one side in the load detection direction Ds.

As illustrated in FIG. 3, the sensor guide 38 is provided as a sensor peripheral portion formed so as to surround the load sensor 32. Specifically, the sensor guide 38 has a tubular shape extending in the load detection direction Ds. The sensor guide 38 is fixed to the pad holder 24 while being fitted into a through-hole penetrating the pad holder 24 of the pedal body 22.

Since the sensor guide 38 extends from the pad holder 24 to the other side in the load detection direction Ds, the sensor guide is placed to protrude from the other surface 24b of the pad holder 24 to the other side in the load detection direction Ds. The sensor guide 38 includes the other end portion 381 placed on the other side in the load detection direction Ds. The other end portion 381 corresponds to a sensor peripheral other end portion of the present disclosure.

In comparison with the arrangement of the load sensor 32, the sensor guide 38 extends to a position on the other side in the load detection direction Ds of the sensor other end portion 325 of the load sensor 32. That is, the other end portion 381 of the sensor guide 38 is located closer to the other side in the load detection direction Ds than the sensor other end portion 325 of the load sensor 32.

As illustrated in FIGS. 3 and 5, the plurality of pins 40 are holders that hold the pedal effort transmission member 34 against the pad holder 24 in a manner that the pedal effort transmission member 34 does not drop from the pad holder 24 of the pedal body 22 even without the pedal pad 28. For example, as illustrated in FIG. 5, when viewed in the direction along the load detection direction Ds, a plurality of pins 40 are provided at equal pitches in the circumferential direction around the pressing portion 342 of the pedal effort transmission member 34. In the present embodiment, for example, three pins 40 are provided.

Specifically, the pin 40 is formed of an elastically deformable resin. In addition, the pin 40 includes an intermediate portion 401 extending in the load detection direction Ds, a head portion 402 provided on one side in the load detection direction Ds of the intermediate portion 401, and a snap-fit portion 403 provided on the other side in the load detection direction Ds of the intermediate portion 401. The intermediate portion 401, the head portion 402, and the snap-fit portion 403 are integrally molded, for example.

As illustrated in FIG. 3, the intermediate portion 401 of the pin 40 is inserted into each of a through-hole formed in the pad holder 24 and a through-hole formed in the base plate 341 of the pedal effort transmission member 34. The head portion 402 of the pin 40 is located closer to one side in the load detection direction Ds than the base plate 341, and has a larger diameter than the through-hole in the base plate 341 into which the intermediate portion 401 is inserted. The head portion 402 of the pin 40 is in contact with the one surface 341a of the base plate 341 from one side in the load detection direction Ds.

The snap-fit portion 403 of the pin 40 has a snap-fit structure. For example, the snap-fit structure includes a claw located closer to the other side in the load detection direction Ds than the pad holder 24. The claw protrudes radially outward from the through-hole in the pad holder 24 into which the intermediate portion 401 is inserted. As a confirmation, the claw of the snap-fit structure is not necessarily in contact with the other surface 24b of the pad holder 24, and a gap in the load detection direction Ds may be generated between the claw and the other surface 24b of the pad holder 24.

The pin 40 is coupled to the pad holder 24 by the snap-fit structure of the snap-fit portion 403. At the same time, the pin 40 includes the head portion 402 described above, and thus the pedal effort transmission member 34 is held against the pad holder 24 via the pin 40 regardless of whether the pedal pad 28 is provided.

Since the pedal effort transmission member 34 and the pad holder 24 are coupled to each other via the pin 40, in the manufacturing process of the pedal device 1, for example, the pedal effort transmission member 34 and the pad holder 24 are fitted into the pedal pad 28 as one unit. At this time, the opening formed on the other side in the load detection direction Ds of the pedal pad 28 is temporarily extended using the elasticity of the pedal pad 28.

Here, a pre-assembly state, which is a state before the pedal effort transmission member 34 and the pad holder 24 are fitted inside the outer peripheral portion 282 of the pedal pad 28, is assumed as a temporary state. In the pre-assembly state, it is assumed that the base plate 341 of the pedal effort transmission member 34 is coupled to the pad holder 24 via the pin 40 in a parallel posture, and the pressing portion 342 of the pedal effort transmission member 34 is in contact with the sensor detector 321 of the load sensor 32. In addition, in the pre-assembly state, the pedal pad 28 is not elastically deformed and is present alone.

In the pre-assembly state, the distance between a portion of the one surface 341a of the pedal effort transmission member 34 that is brought into contact with the tread portion inner surface 281c of the pedal pad 28 and a portion of the other surface 24b of the pad holder 24 that is brought into contact with the one surface 283a of the other-side protrusion 283 is defined as an inter-surface distance La. In addition, the distance between a portion of the tread portion inner surface 281c of the pedal pad 28 in the case of the pedal pad 28 alone, the portion being brought into contact with the one surface 341a of the pedal effort transmission member 34, and the one surface 283a of the other-side protrusion 283 is defined as an in-pad distance Lb. Both the inter-surface distance La and the in-pad distance Lb are distances in the load detection direction Ds.

In this case, the inter-surface distance La and the in-pad distance Lb have a magnitude relationship of "La>Lb". Therefore, in a state where the pedal effort transmission member 34 and the pad holder 24 are fitted inside the outer peripheral portion 282 of the pedal pad 28 as illustrated in FIG. 3, that is, in a completed state of the pedal device 1, the outer peripheral portion 282 of the pedal pad 28 is pulled in the load detection direction Ds.

As a result, in the pedal device 1 of the present embodiment, the outer peripheral portion 282 of the pedal pad 28 is elastically deformed while being pulled in the load detection direction Ds when the driver 81 does not perform the depression operation. Due to the elastic deformation of the outer peripheral portion 282, the pedal pad 28 presses the pressing portion 342 of the pedal effort transmission member 34 against the sensor detector 321 of the load sensor 32.

In this manner, the pedal pad 28 of the present embodiment holds the pedal effort transmission member 34 against the pad holder 24 in a state where the pedal effort transmission member 34 and the pad holder 24 are fitted inside the outer peripheral portion 282. In short, the pedal pad 28 holds the pedal effort transmission member 34 against the pad holder 24 in a manner that the pressing portion 342 is pressed against the load sensor 32 by the elastic deformation of the pedal pad 28 when the driver 81 does not perform the depression operation.

At this time, the pedal effort Fp of the driver 81 is not applied to the load sensor 32 unless the driver 81 performs the depression operation, but a biasing force by which the pedal pad 28 presses the pressing portion 342 against the load sensor 32 due to the elastic deformation thereof is applied to the load sensor 32.

The reaction force generation mechanism 60 illustrated in FIG. 4 generates a reaction force against the pedal effort Fp applied to the pedal pad 28 by the driver 81 performing the depression operation. The reaction force generation mechanism 60 increases the reaction force against the pedal effort Fp as the pedal pad 28 is depressed by the driver 81, that is, as the pedal moving body 20 is rotated to displace the pedal pad 28 to the front of the vehicle. In FIG. 4, the reaction force generation mechanism 60 is illustrated in a simplified manner.

For example, the reaction force generation mechanism 60 includes an elastic member such as one or more springs. The reaction force generation mechanism 60 generates a reaction force against the pedal effort Fp by the elastic deformation of the elastic member. The reaction force generation mechanism 60 is placed in the housing 10.

As illustrated in FIGS. 1 and 2, the rotation angle sensor 79 detects the rotation angle of the pedal body 22 and outputs an electrical signal indicating the rotation angle of the pedal body 22 to the electronic control unit 83. Since the pedal body 22 and the pedal pad 28 are fixed to each other and rotate integrally, the rotation angle of the pedal pad 28 is the same as the rotation angle of the pedal body 22. As the rotation angle sensor 79, for example, a non-contact sensor using a Hall IC, a magnetoresistive element, or the like may be adopted, or a contact sensor may be adopted.

In the pedal device 1 with the configuration described above, when the pedal effort Fp of the driver 81 is applied to the pedal pad 28, the pedal moving body 20 swings about the pedal axis CL as illustrated in FIGS. 1 to 3. Specifically, the pedal moving body 20 swings about the pedal axis CL so as to displace the pedal pad 28 from the position in the non-depression state to the front of the vehicle.

At this time, the rotation angle sensor 79 provided in the pedal device 1 outputs an electrical signal indicating the rotation angle of the pedal body 22 to the electronic control unit 83. At the same time, the load sensor 32 outputs an electrical signal indicating the pedal effort Fp of the driver 81 to the electronic control unit 83. The electronic control unit 83 then controls to drive a brake circuit included in the brake-by-wire system 82 on the basis of various types of information including information obtained from the rotation angle sensor 79 and the load sensor 32, and generates a fluid pressure (for example, a hydraulic pressure) necessary for braking the vehicle 80. The electronic control unit 83 drives the brake pad by the generated fluid pressure to decelerate or stop the vehicle 80.

The pedal device 1 of the present embodiment described above has the following effects.

According to the present embodiment, as illustrated in FIG. 3, the pedal pad 28 holds the pedal effort transmission member 34 against the pad holder 24 in a manner that the pressing portion 342 is pressed against the load sensor 32 by the elastic deformation of the pedal pad 28 when the driver 81 does not perform the depression operation. Therefore, the elastic deformation of the pedal pad 28 can absorb dimensional variations of components such as the pad holder 24 and the pedal effort transmission member 34, and the pressing portion 342 can be brought into contact with the load sensor 32 in a non-depression state where the depression operation is not performed. As a result, adjustment for each product for bringing the pressing portion 342 into contact with the load sensor 32 is unnecessary. This is achieved with a simple structure since the elastic deformation of the pedal pad 28 is used.

When the pedal effort transmission member 34 and the pad holder 24 are fitted inside the outer peripheral portion 282 of the pedal pad 28, a set load previously applied to the load sensor 32 can be generated in the non-depression state of the pedal pad 28.

(1) According to the present embodiment, for example, the elastic material constituting the pedal pad 28 is rubber. Therefore, the change in the set load of the load sensor 32 with respect to the amount of elastic deformation of the pedal pad 28 can be reduced by selecting, for example, the hardness of the rubber. As a result, even if the dimensions of the pedal pad 28 and its peripheral components vary, it is easy to minimize the variation in the set load of the load sensor 32.

(2) According to the present embodiment, the outer peripheral portion 282 of the pedal pad 28 extends from the tread portion 281 to the other side in the load detection direction Ds, and is formed so as to surround the pedal effort transmission member 34 and the pad holder 24. The outer peripheral portion 282 is elastically deformed while being pulled in the load detection direction Ds when the driver 81 does not perform the depression operation. Due to the elastic deformation of the outer peripheral portion 282, the pedal pad 28 presses the pressing portion 342 of the pedal effort transmission member 34 against the load sensor 32.

Therefore, the posture of the pedal effort transmission member 34 is less likely to change, for example, the pedal effort transmission member 34 is less likely to be inclined with respect to the load sensor 32, and the pressing portion 342 of the pedal effort transmission member 34 can be pressed against the load sensor 32 in a stable posture.

(3) According to the present embodiment, the sensor guide 38 is formed so as to surround the load sensor 32. The sensor guide 38 extends from the pad holder 24 to the other side in the load detection direction Ds, and the other end portion 381 of the sensor guide 38 is located closer to the other side in the load detection direction Ds than the sensor other end portion 325 of the load sensor 32.

Therefore, the sensor guide 38 can prevent an external force other than the pedal effort Fp, which is applied from the outside of the pedal device 1, from being directly applied to the load sensor 32, and can protect the load sensor 32 from the external force other than the pedal effort Fp. For example, in a case where the pedal pad 28 is unintentionally kicked up by the driver 81 from the other side in the load detection direction Ds of the load sensor 32 or from the side of the load sensor 32, the load sensor 32 can be protected from the kick up.

(4) According to the present embodiment, as illustrated in FIGS. 2 and 3, the load sensor 32 includes the connector 322 for electrical connection, and the connector 322 is formed to face the other side in the load detection direction Ds. Therefore, moisture is easily discharged from the connector 322 of the load sensor 32 by the action of gravity. As a result, it is possible to prevent moisture due to, for example, snow or the like attached to the foot of the driver 81 from accumulating in the connector 322 of the load sensor 32.

(5) According to the present embodiment, the pedal effort transmission member 34 is held against the pad holder 24 via the pin 40. Therefore, even in a case where the pedal pad 28 is removed from the pad holder 24 for some reason such as the breakage of the pedal pad 28, it is possible to prevent the pedal effort transmission member 34 from dropping from the pad holder 24 and the pedal effort transmission member 34 from being displaced with respect to the pad holder 24.

The pin 40 is coupled to the pad holder 24 by the snap-fit structure. Therefore, the relative position of the pedal effort transmission member 34 with respect to the pad holder 24 can be appropriately restrained by the pin 40 in a manner that the pressing portion 342 of the pedal effort transmission member 34 does not hinder pressing of the load sensor 32. In addition, there is also an advantage that the pin 40 is easily coupled to the pad holder 24 by the snap-fit structure.

SECOND EMBODIMENT

Next, a second embodiment will be described. The present embodiment will mainly describe differences from the first embodiment. In addition, the same or equivalent parts as those in the embodiment described above will be omitted or simplified. The same applies to the description of embodiments to be described later.

Figure 6:
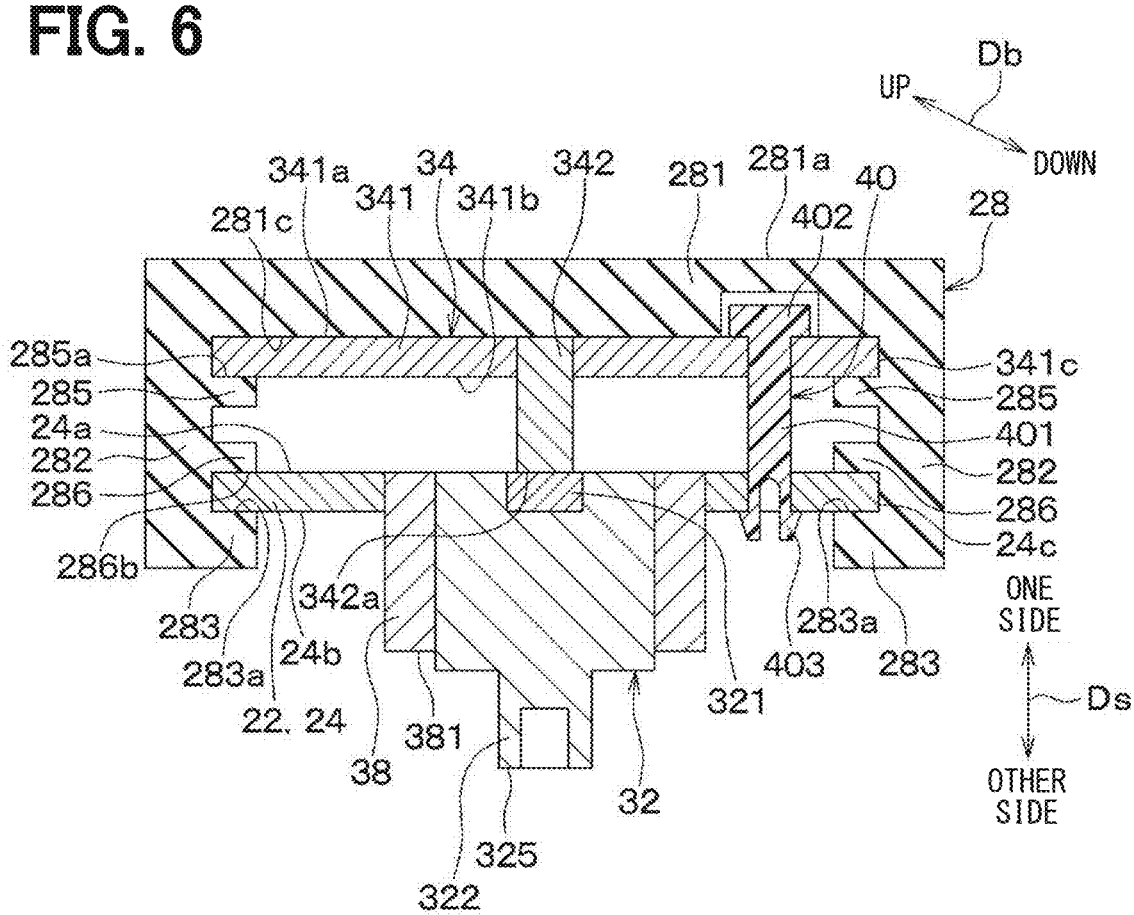
FIG. 6 is a cross-sectional view schematically illustrating a portion of a pedal device of a second embodiment in which a pedal pad is provided in a cross-section perpendicular to a pedal axis, and is a diagram corresponding to FIG. 3.

As illustrated in FIG. 6, the pedal pad 28 of the present embodiment includes a first protrusion 285 and a second protrusion 286 in addition to the tread portion 281, the outer peripheral portion 282, and the other-side protrusion 283. The first protrusion 285 and the second protrusion 286 protrude from the outer peripheral portion 282 to the inside of the outer peripheral portion 282, and are arranged between the pad holder 24 and the base plate 341 of the pedal effort transmission member 34. The first protrusion 285 is placed on one side in the load detection direction Ds of the second protrusion 286.

The first protrusion 285 includes one surface 285a formed on one side in the load detection direction Ds. The one surface 285a of the first protrusion 285 faces the other surface 341b of the base plate 341 in the load detection direction Ds and is in contact with the other surface from the other side in the load detection direction Ds. As a result, the base plate 341 is sandwiched between the tread portion inner surface 281c and the one surface 285a of the first protrusion 285 at a peripheral edge 341c of the base plate 341.

The second protrusion 286 includes the other surface 286b formed on the other side in the load detection direction Ds. The other surface 286b of the second protrusion 286 faces the one surface 24a of the pad holder 24 in the load detection direction Ds and is in contact with the one surface from one side in the load detection direction Ds. As a result, the pad holder 24 is sandwiched between the other surface 286b of the second protrusion 286 and the one surface 283a of the other-side protrusion 283 at the peripheral edge 24c of the pad holder 24.

For example, the first protrusion 285 is provided over the entire peripheral edge 341c of the base plate 341, and the second protrusion 286 is provided over the entire peripheral edge 24c of the pad holder 24. In other words, the first protrusion 285 and the second protrusion 286 are provided over the entire circumference around the load sensor 32 as viewed in the direction along the load detection direction Ds.

The sensor guide 38 of the present embodiment may be the same as the sensor guide 38 of the first embodiment, but the sensor guide 38 of the present embodiment is formed shorter in the load detection direction Ds than the sensor guide 38 of the first embodiment. As a result, in the present embodiment, the other end portion 381 of the sensor guide 38 is located closer to one side in the load detection direction Ds than the sensor other end portion 325 of the load sensor 32.

(1) As described above, according to the present embodiment, the pedal pad 28 includes the first protrusion 285 and the second protrusion 286 in addition to the tread portion 281, the outer peripheral portion 282, and the other-side protrusion 283. The first protrusion 285 and the second protrusion 286 protrude from the outer peripheral portion 282 to the inside of the outer peripheral portion 282, and are arranged between the pad holder 24 and the pedal effort transmission member 34. The first protrusion 285 is in contact with the pedal effort transmission member 34 from the other side in load detection direction Ds, and the second protrusion 286 is in contact with the pad holder 24 from one side in load detection direction Ds.

Therefore, it is possible to prevent the pedal effort transmission member 34 from being displaced or inclined with respect to the pad holder 24 due to the external force applied to the pedal pad 28 from the outside as compared with a case where the first protrusion 285 and the second protrusion 286 are not provided.

The present embodiment is similar to the first embodiment except for the above description. In the present embodiment, the same effects as those of the first embodiment can be obtained from the same configuration as that of the first embodiment.

THIRD EMBODIMENT

Next, a third embodiment will be described. The present embodiment will mainly describe differences from the first embodiment.

Figure 7:
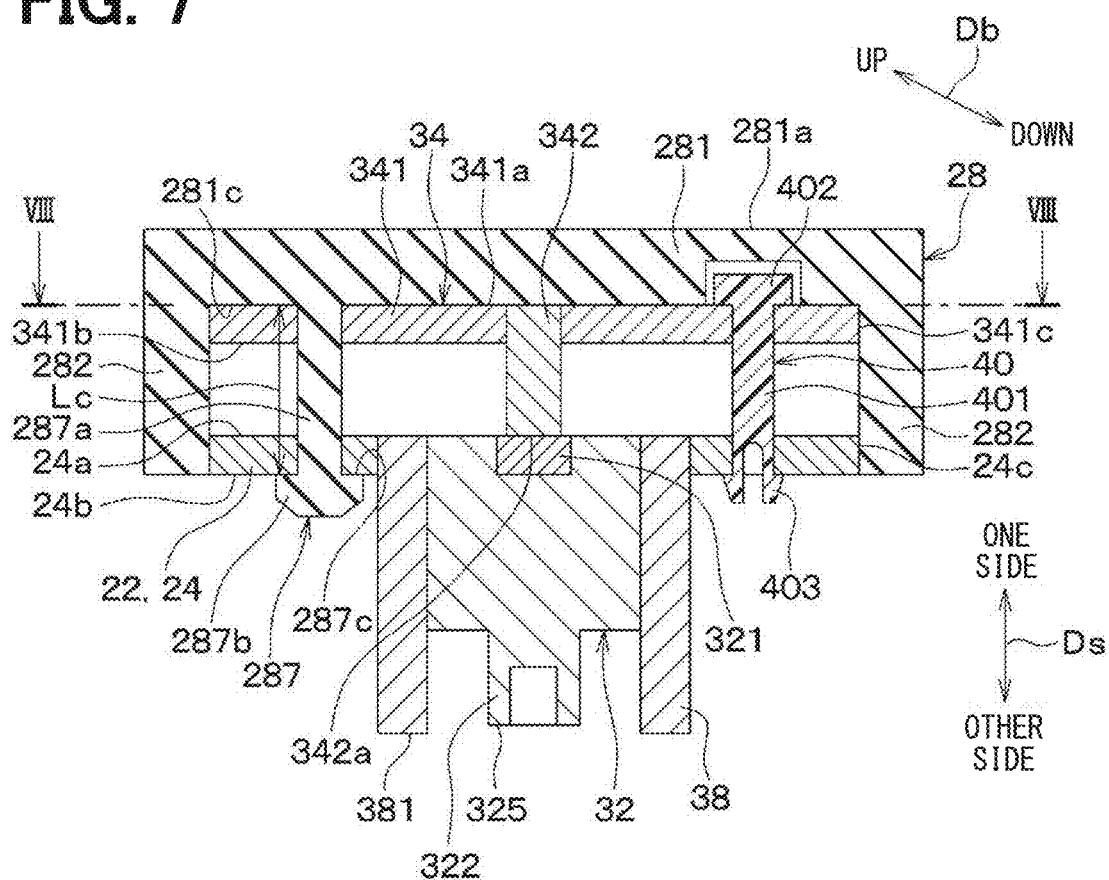
FIG. 7 is a cross-sectional view schematically illustrating a portion of a pedal device of a third embodiment in which a pedal pad is provided in a cross-section perpendicular to a pedal axis, and is a diagram corresponding to FIG. 3.
Figure 8:
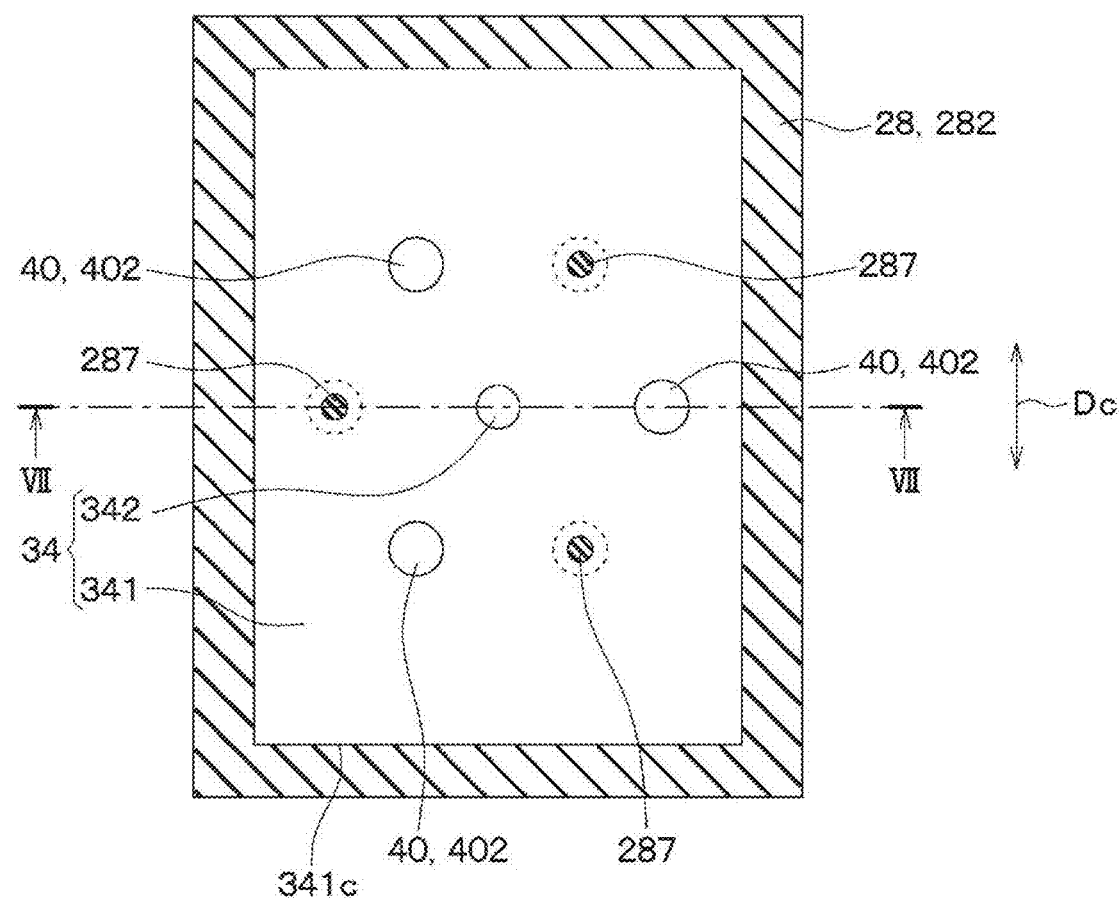
FIG. 8 is a cross-sectional view taken along line VIII-VIII of FIG. 7 in the third embodiment, and is a diagram corresponding to FIG. 5.

As illustrated in FIGS. 7 and 8, the pedal pad 28 of the present embodiment does not include the other-side protrusion 283 (see FIG. 3). Instead, the pedal pad 28 of the present embodiment includes a plurality of extending protrusions 287 protruding so as to extend from the tread portion 281 to the other side in the load detection direction Ds. The tread portion 281, the outer peripheral portion 282, and the extending protrusion 287 of the present embodiment are integrally molded with rubber, for example. FIG. 7 illustrates a cross-section taken along line VII-VII in FIG. 8.

For example, as illustrated in FIG. 8, when viewed in the direction along the load detection direction Ds, a plurality of extending protrusions 287 are provided at equal pitches in the circumferential direction around the pressing portion 342 of the pedal effort transmission member 34. In the present embodiment, for example, three extending protrusions 287 are provided.

The extending protrusion 287 includes a shaft portion 287a extending from the tread portion 281 to the other side in the load detection direction Ds and an enlarged diameter portion 287b coupled to an end portion of the shaft portion 287a on the other side in the load detection direction Ds.

The shaft portion 287a of the pedal pad 28 is formed in a rod shape, for example. The shaft portion 287a is inserted into each of a through-hole formed in the pad holder 24 and a through-hole formed in the base plate 341 of the pedal effort transmission member 34. That is, the shaft portion 287a penetrates both the pad holder 24 and the base plate 341 of the pedal effort transmission member 34.

The enlarged diameter portion 287b of the pedal pad 28 is provided on the other side in the load detection direction Ds of the pad holder 24, and is formed from the shaft portion 287a to be enlarged in diameter. Therefore, the enlarged diameter portion 287b is also larger in the radial direction than the through-hole in the pad holder 24 into which the shaft portion 287a is inserted.

In addition, the enlarged diameter portion 287b includes one surface 287c formed on one side in the load detection direction Ds. The one surface 287c of the enlarged diameter portion 287b faces the other surface 24b of the pad holder 24 in the load detection direction Ds and is in contact with the other surface of the pad holder 24 from the other side in the load detection direction Ds, and is pressed in the load detection direction Ds by the other surface 24b of the pad holder 24.

The enlarged diameter portion 287b of the pedal pad 28 is larger in the radial direction than both the through-hole in the pad holder 24 and the through-hole in the base plate 341, but the enlarged diameter portion 287b is formed of, for example, rubber and thus is elastically deformable. Therefore, when the extending protrusion 287 of the pedal pad 28 is inserted into the through-hole in the pad holder 24 and the through-hole in the base plate 341 in the manufacturing process of the pedal device 1, the extending protrusion 287 is inserted into the individual through-holes in a state where the diameter of the enlarged diameter portion 287b is reduced by elastic deformation.

Here, the pre-assembly state is assumed as a temporary state, as in the description of the first embodiment. In addition, the distance between a portion of the tread portion inner surface 281c of the pedal pad 28 in the case of the pedal pad 28 alone, the portion being brought into contact with the one surface 341a of the pedal effort transmission member 34 around the proximal end of the shaft portion 287a, and the one surface 287c of the enlarged diameter portion 287b is defined as an extending protrusion distance Lc. The extending protrusion distance Lc is also a distance in the load detection direction Ds.

In this case, the inter-surface distance La (see FIG. 3) and the extending protrusion distance Lc have a magnitude relationship of "La>Lc". Therefore, in the completed state of the pedal device 1 illustrated in FIG. 7, the shaft portion 287a of the pedal pad 28 is pulled in the load detection direction Ds.

As a result, in the pedal device 1 of the present embodiment, each of the plurality of the shaft portions 287a of the pedal pad 28 is elastically deformed while being pulled in the load detection direction Ds when the driver 81 does not perform the depression operation. Due to the elastic deformation of the shaft portion 287a, the pedal pad 28 presses the pressing portion 342 of the pedal effort transmission member 34 against the sensor detector 321 of the load sensor 32.

(1) As described above, according to the present embodiment, the pedal pad 28 presses the pressing portion 342 of the pedal effort transmission member 34 against the load sensor 32 by the elastic deformation of the shaft portion 287a. Therefore, as in the first embodiment, dimensional variations of components such as the pad holder 24 and the pedal effort transmission member 34 can be absorbed, and the pressing portion 342 can be brought into contact with the load sensor 32 in the non-depression state of the pedal pad 28.

In the present embodiment, in the pedal pad 28, the extending protrusion 287 is provided instead of the other-side protrusion 283 (see FIG. 3) of the first embodiment. The shaft portion 287a of the extending protrusion 287 penetrates the pad holder 24, and the enlarged diameter portion 287b is in contact with the pad holder 24 from the other side in the load detection direction Ds. The shaft portion 287a of the extending protrusion 287 is elastically deformed while being pulled in the load detection direction Ds when the driver 81 does not perform the depression operation.

Therefore, at the time of assembling the pedal pad 28, the work of meshing the peripheral edge 24c of the pad holder 24 with the other-side protrusion 283 is replaced with the work of inserting the extending protrusion 287 into the through-holes in the pad holder 24 and the base plate 341. As a result, in the manufacturing process of the pedal device 1, the assemblability of the pedal pad 28 can be improved.

The present embodiment is similar to the first embodiment except for the above description. In the present embodiment, the same effects as those of the first embodiment can be obtained from the same configuration as that of the first embodiment.

FOURTH EMBODIMENT

Next, a fourth embodiment will be described. The present embodiment will mainly describe differences from the first embodiment.

Figure 9:
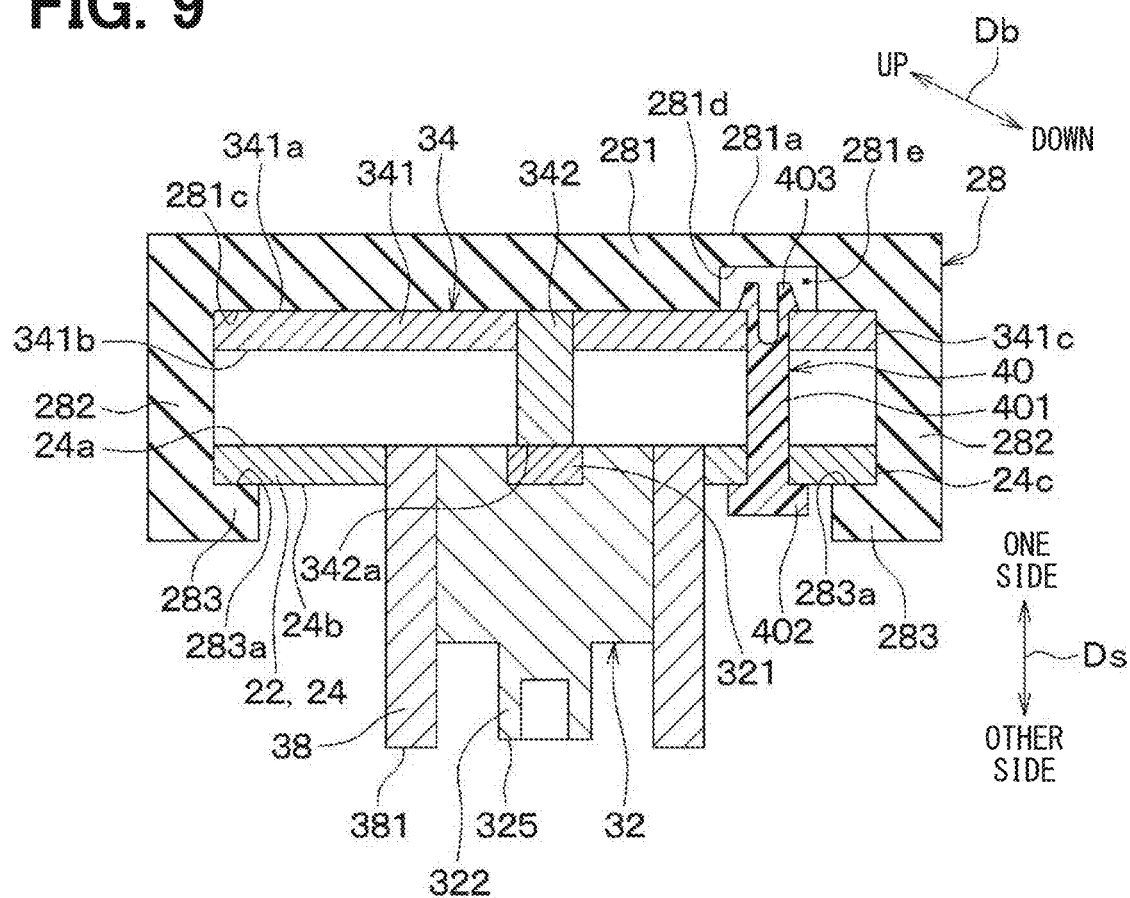
FIG. 9 is a cross-sectional view schematically illustrating a portion of a pedal device of a fourth embodiment in which a pedal pad is provided in a cross-section perpendicular to a pedal axis, and is a diagram corresponding to FIG. 3.

As illustrated in FIG. 9, in the present embodiment, the pedal effort transmission member 34 is held against the pad holder 24 via the pin 40 as in the first embodiment. However, in the present embodiment, the direction of the pin 40 is opposite to that in the first embodiment.

Specifically, the pin 40 of the present embodiment includes the intermediate portion 401, the head portion 402, and the snap-fit portion 403, and the head portion 402 is provided on the other side in the load detection direction Ds of the intermediate portion 401. The snap-fit portion 403 is provided on one side in the load detection direction Ds of the intermediate portion 401.

The head portion 402 of the pin 40 is located closer to the other side in the load detection direction Ds than the pad holder 24, and has a larger diameter than the through-hole in the pad holder 24 into which the intermediate portion 401 of the pin 40 is inserted. The head portion 402 of the pin 40 is in contact with the other surface 24b of the pad holder 24 from the other side in the load detection direction Ds.

The snap-fit structure of the snap-fit portion 403 includes, for example, a claw located closer to one side in the load detection direction Ds than the base plate 341 of the pedal effort transmission member 34. The claw of the snap-fit structure protrudes radially outward from the through-hole in the base plate 341 into which the intermediate portion 401 of the pin 40 is inserted.

The pin 40 is coupled to the base plate 341 of the pedal effort transmission member 34 by the snap-fit structure of the snap-fit portion 403. At the same time, the pin 40 includes the head portion 402 described above, and thus the pedal effort transmission member 34 is held against the pad holder 24 via the pin 40 regardless of whether the pedal pad 28 is provided, as described above.

In the present embodiment, the snap-fit structure of the snap-fit portion 403 is placed so as to protrude to one side in the load detection direction Ds of the one surface 341a of the base plate 341. Therefore, the tread portion 281 of the pedal pad 28 includes a covering portion 281d formed to cover the snap-fit structure of the snap-fit portion 403.

Specifically, the covering portion 281d forms a recessed space 281e recessed from the tread portion inner surface 281c of the pedal pad 28 to one side in the load detection direction Ds. The snap-fit structure of the snap-fit portion 403 is placed so as to enter the recessed space 281e.

(1) As described above, according to the present embodiment, the pedal effort transmission member 34 is held against the pad holder 24 via the resin pin 40, and the pin 40 is coupled to the pedal effort transmission member 34 by the snap-fit structure. The tread portion 281 of the pedal pad 28 includes the covering portion 281d formed to cover the snap-fit structure of the pin 40.

Since the snap-fit structure of the pin 40 is covered and protected by the pedal pad 28, it is possible to prevent the pin 40 from dropping from the pedal effort transmission member 34 and the pad holder 24.

The present embodiment is similar to the first embodiment except for the above description. In the present embodiment, the same effects as those of the first embodiment can be obtained from the same configuration as that of the first embodiment.

Although the present embodiment is a modification based on the first embodiment, the present embodiment can be combined with the second embodiment or the third embodiment described above.

FIFTH EMBODIMENT

Next, a fifth embodiment will be described. The present embodiment will mainly describe differences from the fourth embodiment.

Figure 10:
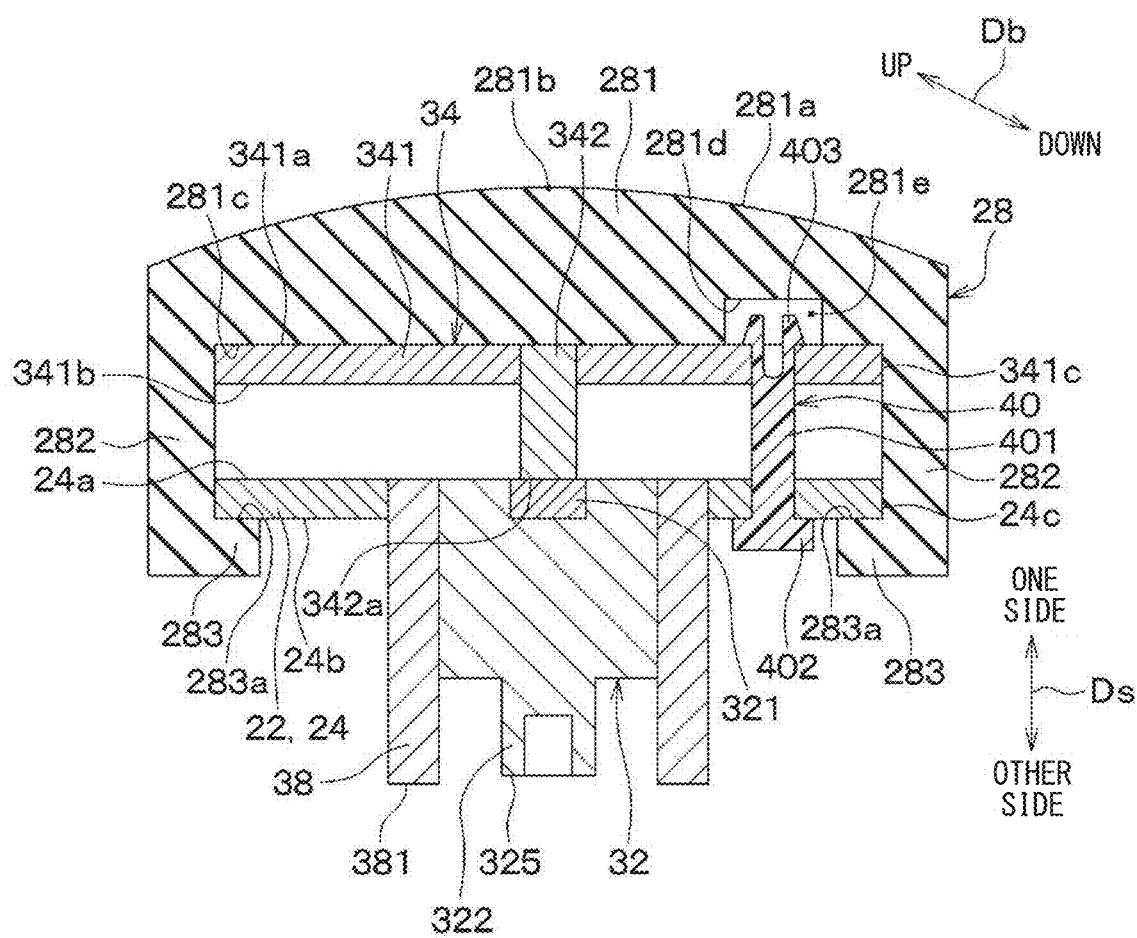
FIG. 10 is a cross-sectional view schematically illustrating a portion of a pedal device of a fifth embodiment in which a pedal pad is provided in a cross-section perpendicular to a pedal axis, and is a diagram corresponding to FIG. 3.

As illustrated in FIG. 10, in the present embodiment, the tread 281a of the pedal pad 28 is not a simple plane but has a tread protruding shape that is a shape bulging to one side in the load detection direction Ds. For example, the tread protruding shape appears as a protruding shape in a cross-section (that is, a cross-section as viewed in the same direction as in FIG. 10) perpendicular to the pedal axis CL. In other words, the tread protruding shape appears as a protruding shape as viewed in a direction along the pedal axis CL. The tread protruding shape may or may not appear as a protruding shape in a cross-section parallel to the pedal axis CL and the load detection direction Ds.

As illustrated in FIG. 10, the tread 281a includes a top 281b that is a portion of the tread 281a located closest to one side in the load detection direction Ds, that is, the top 281b of the tread protruding shape. The top 281b of the tread protruding shape is located so as to overlap one side in the load detection direction Ds of the load sensor 32. In other words, the top 281b of the tread protruding shape is located so as to overlap a projected shape obtained by projecting the load sensor 32 in the load detection direction Ds. Specifically, the top 281b of the tread protruding shape is located so as to overlap one side in the load detection direction Ds of the sensor detector 321 of the load sensor 32 and the pressing portion 342 of the pedal effort transmission member 34.

As described above, according to the present embodiment, the tread 281a of the pedal pad 28 has a tread protruding shape bulging to one side in the load detection direction Ds. The top 281b of the tread protruding shape is located so as to overlap one side in the load detection direction Ds of the load sensor 32.

Therefore, for example, as compared with a case where the tread 281a has a planar shape, it is possible to make it easier for the driver 81 to depress the pedal pad 28 immediately above the load sensor 32 when performing the depression operation. It is easy to prevent the pedal pad 28 from being depressed at a position deviated from immediately above the load sensor 32. As a result, it is possible to improve the detection accuracy of the pedal effort Fp of the driver 81 detected by the load sensor 32.

The present embodiment is similar to the fourth embodiment except for the above description. In the present embodiment, the same effects as those of the fourth embodiment can be obtained from the same configuration as that of the fourth embodiment.

Although the present embodiment is a modification based on the fourth embodiment, the present embodiment can be combined with any of the first to third embodiments described above.

SIXTH EMBODIMENT

Next, a sixth embodiment will be described. The present embodiment will mainly describe differences from the fifth embodiment.

Figure 11:
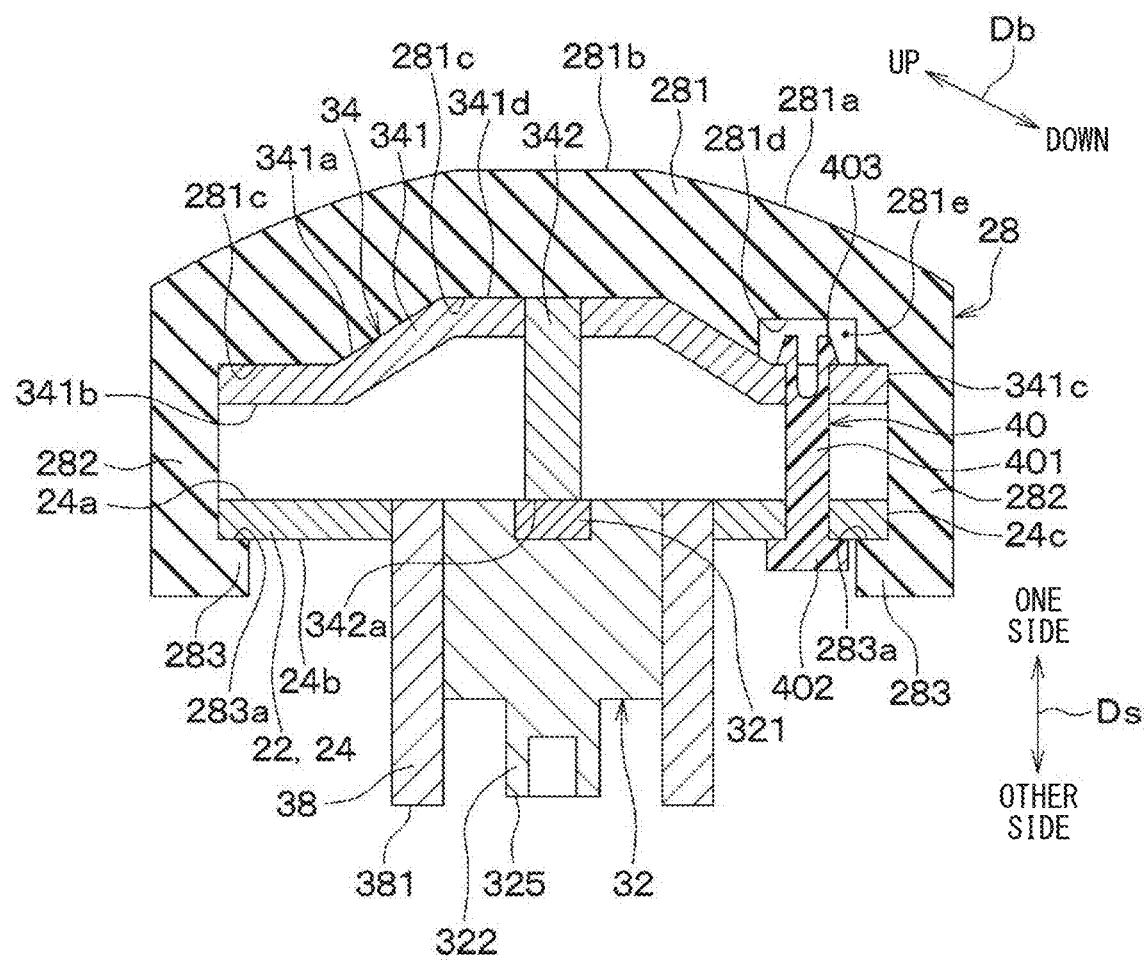
FIG. 11 is a cross-sectional view schematically illustrating a portion of a pedal device of a sixth embodiment in which a pedal pad is provided in a cross-section perpendicular to a pedal axis, and is a diagram corresponding to FIG. 3.

As illustrated in FIG. 11, in the present embodiment, the shape of the tread 281a of the pedal pad 28 and the base plate 341 of the pedal effort transmission member 34 are different from those of the fifth embodiment.

Specifically, in the present embodiment, the base plate 341 of the pedal effort transmission member 34 does not have a flat plate shape but has a plate shape bulging to one side in the load detection direction Ds. Therefore, one surface 341a of the base plate 341 has a shape bulging to one side in the load detection direction Ds, and the other surface 341b of the base plate 341 has a shape recessed to one side in the load detection direction Ds. In the present embodiment, the shape of the one surface 341a bulging to one side in the load detection direction Ds is referred to as "transmission member protruding shape".

For example, as illustrated in FIG. 11, the transmission member protruding shape of the one surface 341a appears as a protruding shape in a cross-section (that is, a cross-section as viewed in the same direction as in FIG. 11) perpendicular to the pedal axis CL. In other words, the transmission member protruding shape appears as a protruding shape as viewed in a direction along the pedal axis CL. The transmission member protruding shape may or may not appear as a protruding shape in a cross-section parallel to the pedal axis CL and the load detection direction Ds.

Although the one surface 341a of the present embodiment does not have a flat plate shape but has a transmission member protruding shape, there is no change in that the one surface is a surface facing one side in the load detection direction Ds. The one surface 341a of the present embodiment is in contact with the tread portion inner surface 281c of the pedal pad 28 from the other side in the load detection direction Ds, as in the fifth embodiment.

As illustrated in FIG. 11, the one surface 341a of the base plate 341 includes a top 341d that is a portion of the one surface 341a located closest to one side in the load detection direction Ds, that is, the top 341d of the transmission member protruding shape. The top 341d of the transmission member protruding shape is located so as to overlap one side in the load detection direction Ds of the load sensor 32. In other words, the top 341d of the transmission member protruding shape is located so as to overlap a projected shape obtained by projecting the load sensor 32 in the load detection direction Ds.

In the present embodiment, the tread 281a of the pedal pad 28 has a tread protruding shape similar to that in the fifth embodiment. In the present embodiment, the top 281b of the tread protruding shape is located so as to overlap one side in the load detection direction Ds of the load sensor 32 as in the fifth embodiment.

However, the detailed shape of the tread 281a in the present embodiment is different from that in the fifth embodiment. Specifically, the top 281b of the tread protruding shape of the tread 281a is a flat surface facing one side in the load detection direction Ds.

(1) As described above, according to the present embodiment, the tread 281a of the pedal pad 28 has a tread protruding shape bulging to one side in the load detection direction Ds. The one surface 341a of the base plate 341 in contact with the tread portion 281 of the pedal pad 28 from the other side in the load detection direction Ds has a transmission member protruding shape bulging to one side in the load detection direction Ds. The top 281b of the tread protruding shape and the top 341d of the transmission member protruding shape are located so as to overlap one side in the load detection direction Ds of the load sensor 32.

Therefore, for example, as compared with a case where the tread 281a has a planar shape, it is possible to make it easier for the driver 81 to depress the pedal pad 28 immediately above the load sensor 32 when performing the depression operation. It is easy to prevent the pedal pad 28 from being depressed at a position deviated from immediately above the load sensor 32. As a result, it is possible to improve the detection accuracy of the pedal effort Fp of the driver 81 detected by the load sensor 32.

In addition, since the one surface 341a of the base plate 341 has a transmission member protruding shape, for example, as compared with a case where the one surface 341a has a planar shape, it is easy to increase the amount of protrusion of the tread protruding shape of the tread 281a while the thickness of the tread portion 281 is sufficiently ensured over the entire tread portion 281.

(2) According to the present embodiment, the top 281b of the tread protruding shape of the tread 281a is flat. Therefore, since the top 281b of the tread 281a can be depressed by the ball of the foot of various sizes, the driver 81 can easily perform the operation of depressing the tread 281a as compared with the case where the top 281b of the tread 281a is formed by a curved surface, for example.

The present embodiment is similar to the fifth embodiment except for the above description. In the present embodiment, the same effects as those of the fifth embodiment can be obtained from the same configuration as that of the fifth embodiment.

SEVENTH EMBODIMENT

Next, a seventh embodiment will be described. The present embodiment will mainly describe differences from the first embodiment.

Figure 12:
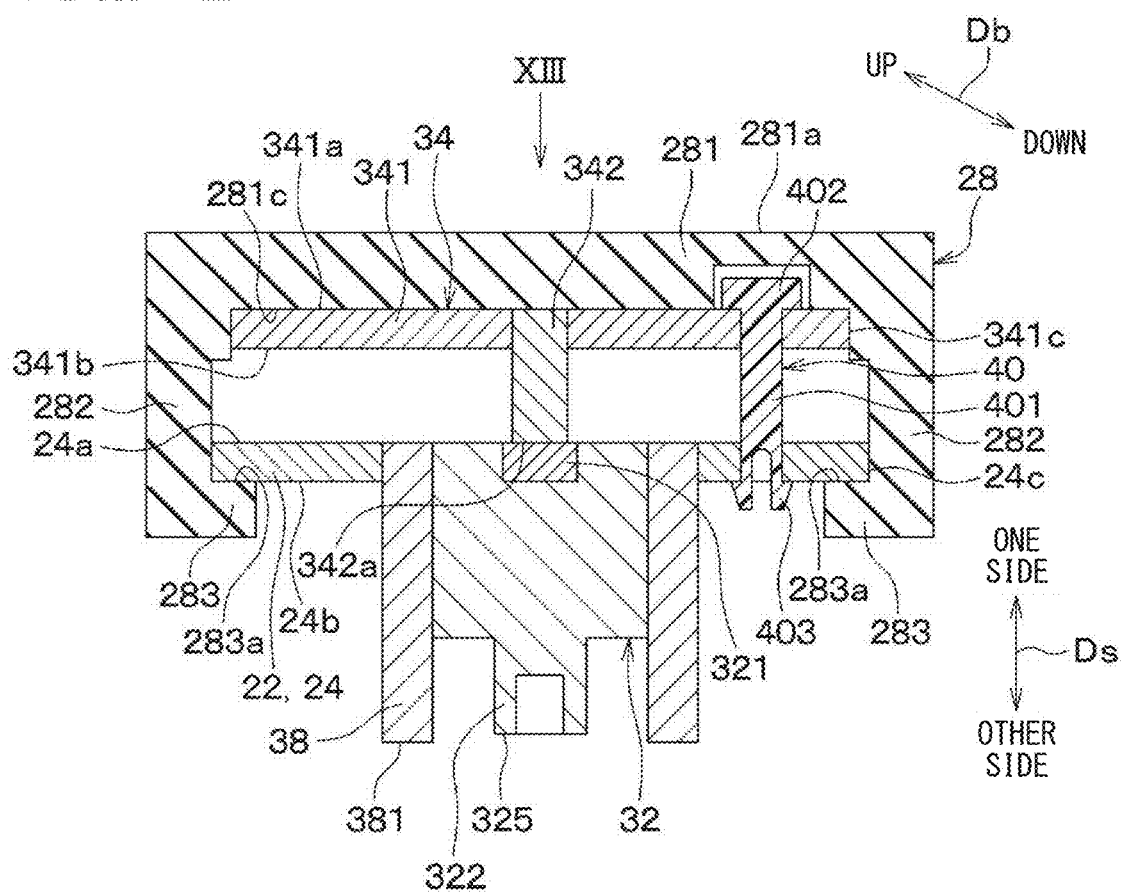
FIG. 12 is a cross-sectional view schematically illustrating a portion of a pedal device of a seventh embodiment in which a pedal pad is provided in a cross-section perpendicular to a pedal axis, and is a diagram corresponding to FIG. 3.
Figure 13:
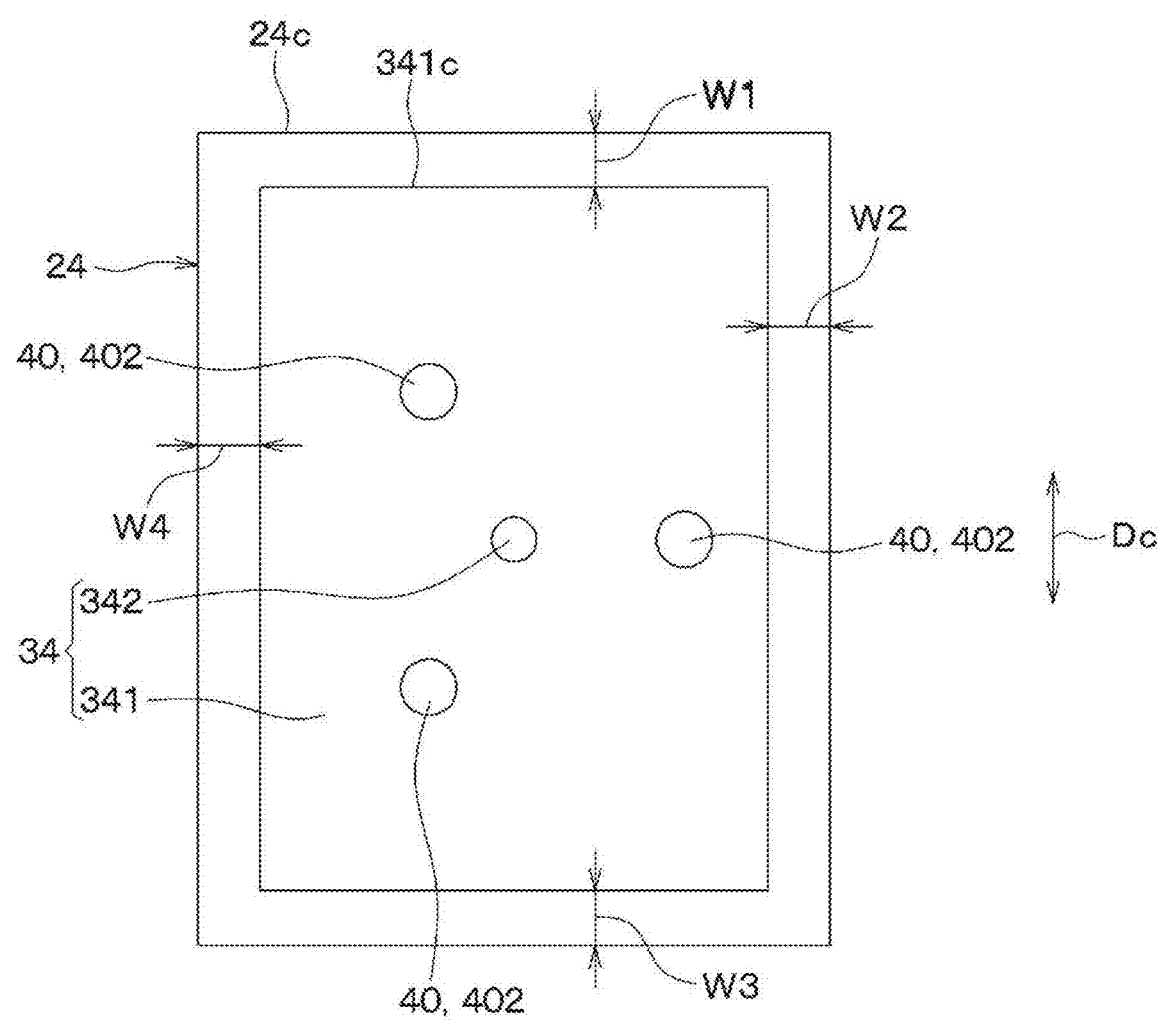
FIG. 13 is a view as viewed in a direction of an arrow XIII in FIG. 12 without illustrating the pedal pad in the seventh embodiment.

As illustrated in FIGS. 12 and 13, also in the present embodiment, the base plate 341 of the pedal effort transmission member 34 has a shape that does not protrude outward from the peripheral edge 24c of the pad holder 24 as viewed in a direction along the load detection direction Ds, as in the first embodiment. However, in the present embodiment, the size of the pad holder 24 and the size of the pedal effort transmission member 34 are different as viewed in the direction along the load detection direction Ds.

More specifically, as viewed in the direction along the load detection direction Ds, the pad holder 24 has a shape that is wider than the pedal effort transmission member 34 over the entire circumference of the pedal effort transmission member 34. In short, the pad holder 24 is formed larger than the pedal effort transmission member 34 over the entire circumference of the pedal effort transmission member 34 as viewed in the direction along the load detection direction Ds. For example, as indicated by arrows W1, W2, W3, and W4 in FIG. 13, the pad holder 24 protrudes outward from the pedal effort transmission member 34 as viewed in the direction along the load detection direction Ds.

(1) As described above, according to the present embodiment, the pedal effort transmission member 34 has a shape that does not protrude outward from the peripheral edge 24c of the pad holder 24 as viewed in the direction along the load detection direction Ds, as in the first embodiment. Therefore, in a case where an external force other than the pedal effort Fp is applied to the pedal pad 28 by being kicked up by the driver 81 from the other side in the load detection direction Ds or from the downward of the vehicle, for example, the influence of the external force on the pedal effort transmission member 34 can be reduced by the pad holder 24. As a result, it is easy to prevent the pedal pad 28 from being deformed or dropped due to the kick up by the driver 81 or the like.

In particular, in the present embodiment, since the pad holder 24 has a shape wider than the pedal effort transmission member 34 over the entire circumference of the pedal effort transmission member 34, the effect of preventing the pedal pad 28 from being deformed or dropped is easily obtained as compared with the first embodiment.

The present embodiment is similar to the first embodiment except for the above description. In the present embodiment, the same effects as those of the first embodiment can be obtained from the same configuration as that of the first embodiment.

Although the present embodiment is a modification based on the first embodiment, the present embodiment can be combined with any of the second to sixth embodiments described above.

OTHER EMBODIMENTS (1) In each of the embodiments described above, as illustrated in FIG. 2, the pedal moving body 20 swings about the pedal axis CL with respect to the housing 10 in response to the depression operation of the driver 81, but this is an example. The pedal moving body 20 does not need to swing but may linearly move with respect to the housing 10 in response to the depression operation of the driver 81, for example.

(2) In the first embodiment described above, the other-side protrusion 283 of the pedal pad 28 illustrated in FIG. 3 is provided over the entire peripheral edge 24c of the pad holder 24, for example, but this is an example. The other-side protrusion 283 may be partially provided over the peripheral edge 24c of the pad holder 24.

(3) In each of the embodiments described above, the elastic material constituting the pedal pad 28 illustrated in FIG. 3 is, for example, rubber, but may be another material other than rubber.

(4) In each of the embodiments described above, as illustrated in FIG. 2, the pedal axis CL as the rotation center of the swing operation of the pedal moving body 20 is fixed at a fixed position in the housing 10, but this is an example. For example, the pedal device 1 may be configured in a manner that the pedal axis CL moves in parallel to some extent in response to the depression operation of the driver 81.

(5) In each of the embodiments described above, as illustrated in FIG. 5, three pins 40 are provided, but one, two, or four or more pins may be provided.

(6) In the third embodiment described above, as illustrated in FIG. 8, three extending protrusions 287 are provided, but one, two, or four or more extending protrusions may be provided.

(7) In the second embodiment described above, as illustrated in FIG. 6, the first protrusion 285 and the second protrusion 286 separately protrude from the outer peripheral portion 282 to the inside of the outer peripheral portion 282, but this is an example. For example, the first protrusion 285 and the second protrusion 286 may be connected in the load detection direction Ds and integrally protrude from the outer peripheral portion 282 to the inside of the outer peripheral portion 282.

(8) In each of the embodiments described above, the pedal device 1 is used as a brake pedal device, but this is an example. For example, the pedal device 1 may be used as an accelerator pedal device operated to adjust an output of a drive source of the vehicle 80. Furthermore, the pedal device 1 can be various devices operated by the driver 81 with the foot.

(9) In each of the embodiments described above, as illustrated in FIG. 2, the support that operatively supports the pedal moving body 20 is specifically the housing 10 as a housing that houses the reaction force generation mechanism 60 and the like, but this is an example. The support does not need to be formed as a housing.

(10) In the first embodiment described above, as illustrated in FIG. 3, the sensor guide 38 extends from the pad holder 24 to the other side in the load detection direction Ds, and the other end portion 381 of the sensor guide 38 is located closer to the other side in the load detection direction Ds than the sensor other end portion 325. However, this is an example. For example, the other end portion 381 of the sensor guide 38 may be located at the same position as the sensor other end portion 325 in the load detection direction Ds.

Figure 14:
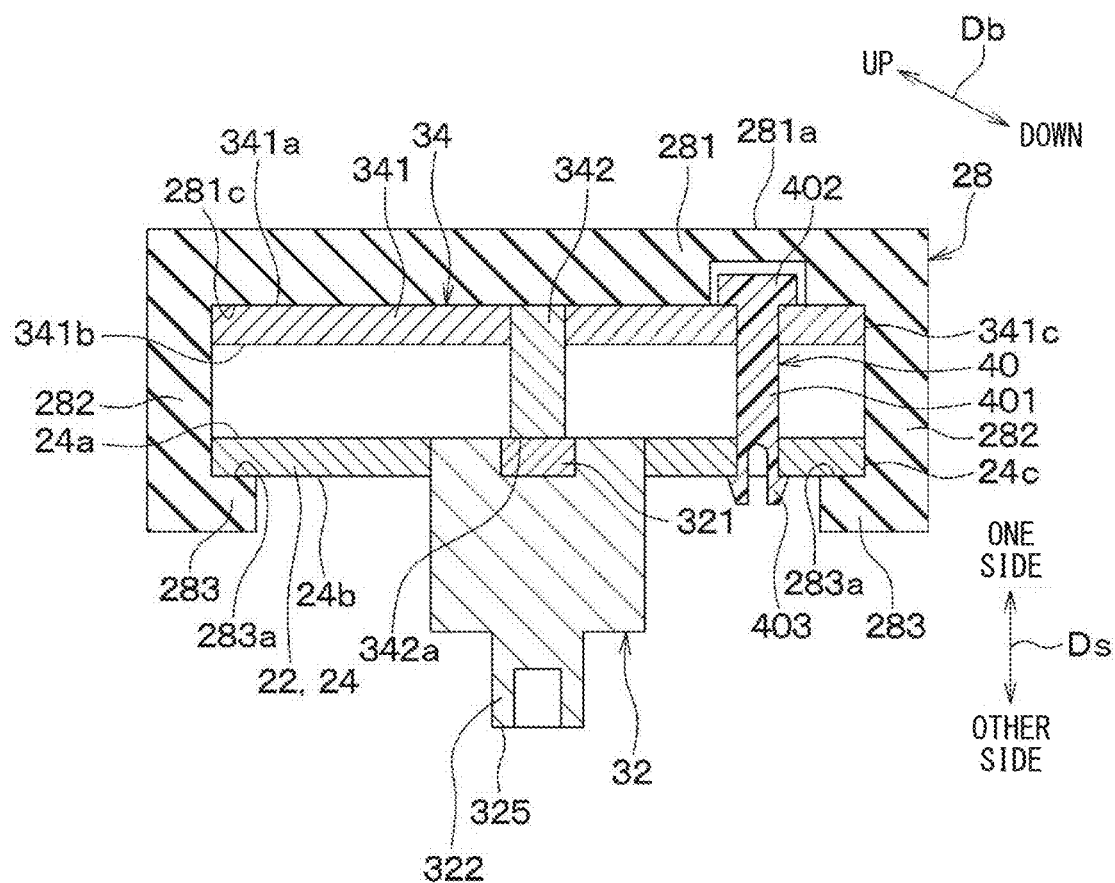
FIG. 14 is a cross-sectional view schematically illustrating a portion of a pedal device of a modification of the first embodiment in which a pedal pad is provided in a cross-section perpendicular to a pedal axis, and is a diagram corresponding to FIG. 3.

(11) In each of the embodiments described above, for example, as illustrated in FIG. 3, the load sensor 32 is fixed to the pad holder 24 of the pedal body 22 via the sensor guide 38, but this is an example. For example, as illustrated in FIG. 14, the sensor guide 38 does not need to be provided, and the load sensor 32 may be directly fixed to the pad holder 24 of the pedal body 22.

(12) In each of the embodiments described above, as illustrated in FIG. 2, the pedal device 1 is a suspended pedal device, but this is an example. For example, the pedal device 1 may be an organ-type pedal device.

(13) The present disclosure is not limited to the embodiments described above, and various modifications can be made. In addition, the embodiments described above are not unrelated to each other, and can be appropriately combined unless the combination is obviously impossible.

In addition, in each of the above embodiments, it goes without saying that the elements constituting the embodiments are not necessarily essential except for a case where it is explicitly stated that the elements are particularly essential and a case where the elements are considered to be obviously essential in principle. In each of the above embodiments, when a numerical value such as the number, numerical value, amount, range, or the like of the constituent elements of the embodiment is mentioned, the numerical value is not limited to a specific number unless otherwise specified as essential or obviously limited to the specific number in principle. In each of the above embodiments, when the material, shape, positional relationship, and the like of the constituent elements and the like are referred to, the material, the shape, the positional relationship, and the like are not limited unless otherwise specified or limited to specific materials, shapes, positional relationships, and the like in principle.

FEATURES OF THE PRESENT DISCLOSURE

Perspective 1

A pedal device to be provided in a vehicle (80), the pedal device comprising:
  a support (10) to be fixed to a vehicle body (801);
  a pedal body (22) including a pad holder (24) and operatively coupled to the support;
  a pedal pad (28) including a tread portion (281) to be depressed by a driver (81) by a depression operation of the driver, the pedal pad affixed to the pad holder, including an elastically deformable elastic material, and to be displaced together with the pad holder with respect to the support by the depression operation;
  a load sensor (32) fixed to the pad holder and configured to detect a pedal effort (Fp) of the driver acting on the pedal pad in response to the depression operation; and
  a pedal effort transmission member (34) including a pressing portion (342) pressing the load sensor to transmit the pedal effort to the load sensor, the pedal effort transmission member placed between the tread portion and both the load sensor and the pad holder to be pressed by the tread portion, wherein
  the pedal pad holds the pedal effort transmission member against the pad holder so as to cause the pressing portion to be pressed against the load sensor by elastic deformation of the pedal pad when the depression operation is not performed.

Perspective 2

The pedal device of the perspective 1, wherein the elastic material of the pedal pad is rubber.

Perspective 3

The pedal device according to the perspective 1 or 2, wherein
  the pedal body is configured to swing about a pedal axis (CL) with respect to the support in response to the depression operation,
  the pedal effort transmission member is placed on one side in one direction (Ds) with respect to the pad holder and the load sensor, the one direction being perpendicular to the pedal axis,
  the load sensor is pressed by the pressing portion to an other side opposite to the one side in the one direction,
  the tread portion is placed on the one side in the one direction with respect to the pedal effort transmission member and is to be depressed by the driver from the one side in the one direction,
  the pedal pad includes, in addition to the tread portion,
    an outer peripheral portion (282) formed to surround the pedal effort transmission member and the pad holder and extending from the tread portion to the other side in the one direction, and
    an other-side protrusion (283) provided on the other side in the one direction with respect to the pad holder and protruding from the outer peripheral portion to inside of the outer peripheral portion,
  the other-side protrusion is in contact with the pad holder from the other side in the one direction,
  the outer peripheral portion is elastically deformed while being pulled in the one direction when the depression operation is not performed, and
  the pedal pad presses the pressing portion against the load sensor by the elastic deformation of the outer peripheral portion.

Perspective 4

The pedal device according to the perspective 3, wherein
  the pedal pad includes a first protrusion (285) and a second protrusion (286) each protruding from the outer peripheral portion to the inside of the outer peripheral portion and placed between the pedal effort transmission member and the pad holder,
  the first protrusion is in contact with the pedal effort transmission member from the other side in the one direction, and
  the second protrusion is in contact with the pad holder from the one side in the one direction.

Perspective 5

The pedal device according to the perspective 1 or 2, wherein
  the pedal body is configured to swing about a pedal axis (CL) with respect to the support in response to the depression operation,
  the pedal effort transmission member is placed on one side in one direction (Ds) with respect to the pad holder and the load sensor, the one direction being perpendicular to the pedal axis,
  the load sensor is pressed by the pressing portion to an other side opposite to the one side in the one direction,
  the tread portion is placed on the one side in the one direction with respect to the pedal effort transmission member and is to be depressed by the driver from the one side in the one direction,
  the pedal pad includes, in addition to the tread portion,
    a shaft portion (287a) extending from the tread portion to the other side in the one direction and penetrating the pad holder, and
    an enlarged diameter portion (287b) provided on the other side in the one direction with respect to the pad holder and enlarged in diameter from the shaft portion,
  the enlarged diameter portion is in contact with the pad holder from the other side in the one direction,
  the shaft portion is pulled in the one direction and elastically deformed when the depression operation is not performed, and the pedal pad presses the pressing portion against the load sensor by the elastic deformation of the shaft portion.

Perspective 6

The pedal device according to the perspective 1 or 2, further comprising:
a sensor peripheral portion (38) fixed to the pad holder and surrounds the load sensor, wherein
the pedal body is configured to swing about a pedal axis (CL) with respect to the support in response to the depression operation,
the pedal effort transmission member is placed on one side in one direction (Ds) with respect to the pad holder and the load sensor, the one direction being perpendicular to the pedal axis,
the load sensor is pressed by the pressing portion to an other side opposite to the one side in the one direction,
the tread portion is placed on the one side in the one direction with respect to the pedal effort transmission member and is to be depressed by the driver from the one side in the one direction,
the load sensor includes a sensor other end portion (325) located on the other side in the one direction,
the sensor peripheral portion includes a sensor peripheral other end portion (381) extending to the other side in the one direction with respect to the pad holder and located on the other side in the one direction, and
the sensor peripheral other end portion is located at a same position as the sensor other end portion in the one direction or closer to the other side in the one direction than the sensor other end portion.

Perspective 7

The pedal device according to the perspective 1 or 2, wherein
the pedal body is configured to swing about a pedal axis (CL) with respect to the support in response to the depression operation,
the pedal effort transmission member is placed on one side in one direction (Ds) with respect to the pad holder and the load sensor, the one direction being perpendicular to the pedal axis,
the load sensor includes a connector (322) for electrical connection and is pressed by the pressing portion to an other side opposite to the one side in the one direction,
when the depression operation is not performed, the other side in the one direction is directed obliquely downward of the vehicle, and
the connector is directed to the other side in the one direction.

Perspective 8

The pedal device according to any one of the perspectives 1 to 7, further comprising:
a pin (40) made of resin and coupled to one of the pad holder and the pedal effort transmission member by a snap-fit structure, wherein
the pedal effort transmission member is held with respect to the pad holder via the pin.

Perspective 9

The pedal device according to any one of the perspectives 1 to 7, further comprising:
a pin (40) made of resin and coupled to the pedal effort transmission member by a snap-fit structure, wherein
the pedal effort transmission member is held with respect to the pad holder via the pin, and
the tread portion includes a covering portion (281d) covering the snap-fit structure.

Perspective 10

The pedal device according to the perspective 1 or 2, wherein
the pedal body is configured to swing about a pedal axis (CL) with respect to the support in response to the depression operation,
the pedal effort transmission member is placed on one side in one direction (Ds) with respect to the pad holder and the load sensor, the one direction being perpendicular to the pedal axis,
the load sensor is pressed to an other side opposite to the one side in the one direction by the pressing portion,
the tread portion is placed on the one side in the one direction with respect to the pedal effort transmission member and is to be depressed by the driver from the one side in the one direction, and
the pedal effort transmission member does not protrude outward beyond a peripheral edge (24c) of the pad holder when viewed in a direction along the one direction.

Perspective 11

The pedal device according to the perspective 1 or 2, wherein
the pedal body is configured to swing about a pedal axis (CL) with respect to the support in response to the depression operation,
the pedal effort transmission member is placed on one side in one direction (Ds) with respect to the pad holder and the load sensor, the one direction being perpendicular to the pedal axis,
the load sensor is pressed by the pressing portion to an other side opposite to the one side in the one direction,
the tread portion includes a tread (281a) that has a tread protruding shape bulging to the one side in the one direction and that is to be depressed by the driver from the one side in the one direction, the tread portion being placed on the one side in the one direction with respect to the pedal effort transmission member,
the pedal effort transmission member includes one surface (341a) having a transmission member protruding shape bulging to the one side in the one direction and directed to the one side in the one direction,
the one surface is in contact with the tread portion from the other side in the one direction, and
a top (281b) of the tread protruding shape and a top (341d) of the transmission member protruding shape overlap with the load sensor on the one side in the one direction.

Perspective 12

The pedal device according to the perspective 11, wherein a top of the tread protruding shape is flat.

What is claimed is:

1. A pedal device to be provided in a vehicle, the pedal device comprising:
    a support to be fixed to a vehicle body;
    a pedal body including a pad holder and operatively coupled to the support;
    a pedal pad including a tread portion to be depressed by a driver by a depression operation of the driver, the pedal pad affixed to the pad holder, including an elastically deformable elastic material, and to be displaced together with the pad holder with respect to the support by the depression operation;
    a load sensor fixed to the pad holder and configured to detect a pedal effort of the driver acting on the pedal pad in response to the depression operation; and
    a pedal effort transmission member including a pressing portion pressing the load sensor to transmit the pedal effort to the load sensor, the pedal effort transmission member placed between the tread portion and both the load sensor and the pad holder to be pressed by the tread portion, wherein
    the pedal pad holds the pedal effort transmission member against the pad holder so as to cause the pressing portion to be pressed against the load sensor by elastic deformation of the pedal pad when the depression operation is not performed.

2. The pedal device of claim 1, wherein the elastic material of the pedal pad is rubber.

3. The pedal device according to claim 1, wherein
    the pedal body is configured to swing about a pedal axis with respect to the support in response to the depression operation,
    the pedal effort transmission member is placed on one side in one direction with respect to the pad holder and the load sensor, the one direction being perpendicular to the pedal axis,
    the load sensor is pressed by the pressing portion to an other side opposite to the one side in the one direction,
    the tread portion is placed on the one side in the one direction with respect to the pedal effort transmission member and is to be depressed by the driver from the one side in the one direction,
    the pedal pad includes, in addition to the tread portion,
        an outer peripheral portion formed to surround the pedal effort transmission member and the pad holder and extending from the tread portion to the other side in the one direction, and
        an other-side protrusion provided on the other side in the one direction with respect to the pad holder and protruding from the outer peripheral portion to inside of the outer peripheral portion,
    the other-side protrusion is in contact with the pad holder from the other side in the one direction,
    the outer peripheral portion is elastically deformed while being pulled in the one direction when the depression operation is not performed, and
    the pedal pad presses the pressing portion against the load sensor by the elastic deformation of the outer peripheral portion.

4. The pedal device according to claim 3, wherein
    the pedal pad includes a first protrusion and a second protrusion each protruding from the outer peripheral portion to the inside of the outer peripheral portion and placed between the pedal effort transmission member and the pad holder,
    the first protrusion is in contact with the pedal effort transmission member from the other side in the one direction, and
    the second protrusion is in contact with the pad holder from the one side in the one direction.

5. The pedal device according to claim 1, wherein
    the pedal body is configured to swing about a pedal axis with respect to the support in response to the depression operation,
    the pedal effort transmission member is placed on one side in one direction with respect to the pad holder and the load sensor, the one direction being perpendicular to the pedal axis,
    the load sensor is pressed by the pressing portion to an other side opposite to the one side in the one direction,
    the tread portion is placed on the one side in the one direction with respect to the pedal effort transmission member and is to be depressed by the driver from the one side in the one direction,
    the pedal pad includes, in addition to the tread portion,
        a shaft portion extending from the tread portion to the other side in the one direction and penetrating the pad holder, and
        an enlarged diameter portion provided on the other side in the one direction with respect to the pad holder and enlarged in diameter from the shaft portion,
    the enlarged diameter portion is in contact with the pad holder from the other side in the one direction,
    the shaft portion is pulled in the one direction and elastically deformed when the depression operation is not performed, and
    the pedal pad presses the pressing portion against the load sensor by the elastic deformation of the shaft portion.

6. The pedal device according to claim 1, further comprising:
    a sensor peripheral portion fixed to the pad holder and surrounds the load sensor, wherein
    the pedal body is configured to swing about a pedal axis with respect to the support in response to the depression operation,
    the pedal effort transmission member is placed on one side in one direction with respect to the pad holder and the load sensor, the one direction being perpendicular to the pedal axis,
    the load sensor is pressed by the pressing portion to an other side opposite to the one side in the one direction,
    the tread portion is placed on the one side in the one direction with respect to the pedal effort transmission member and is to be depressed by the driver from the one side in the one direction,
    the load sensor includes a sensor other end portion located on the other side in the one direction,
    the sensor peripheral portion includes a sensor peripheral other end portion extending to the other side in the one direction with respect to the pad holder and located on the other side in the one direction, and
    the sensor peripheral other end portion is located at a same position as the sensor other end portion in the one direction or closer to the other side in the one direction than the sensor other end portion.

7. The pedal device according to claim 1, wherein
    the pedal body is configured to swing about a pedal axis with respect to the support in response to the depression operation, the pedal effort transmission member is placed on one side in one direction with respect to the pad holder and the load sensor, the one direction being perpendicular to the pedal axis, the load sensor includes a connector for electrical connection and is pressed by the pressing portion to an other side opposite to the one side in the one direction, when the depression operation is not performed, the other side in the one direction is directed obliquely downward of the vehicle, and the connector is directed to the other side in the one direction.

8. The pedal device according to claim 1, further comprising:

a pin made of resin and coupled to one of the pad holder and the pedal effort transmission member by a snap-fit structure, wherein the pedal effort transmission member is held with respect to the pad holder via the pin.

9. The pedal device according to claim 1, further comprising:

a pin made of resin and coupled to the pedal effort transmission member by a snap-fit structure, wherein the pedal effort transmission member is held with respect to the pad holder via the pin, and the tread portion includes a covering portion covering the snap-fit structure.

10. The pedal device according to claim 1, wherein the pedal body is configured to swing about a pedal axis with respect to the support in response to the depression operation, the pedal effort transmission member is placed on one side in one direction with respect to the pad holder and the load sensor, the one direction being perpendicular to the pedal axis, the load sensor is pressed to an other side opposite to the one side in the one direction by the pressing portion, the tread portion is placed on the one side in the one direction with respect to the pedal effort transmission member and is to be depressed by the driver from the one side in the one direction, and the pedal effort transmission member does not protrude outward beyond a peripheral edge of the pad holder when viewed in a direction along the one direction.

11. The pedal device according to claim 1, wherein the pedal body is configured to swing about a pedal axis with respect to the support in response to the depression operation, the pedal effort transmission member is placed on one side in one direction with respect to the pad holder and the load sensor, the one direction being perpendicular to the pedal axis, the load sensor is pressed by the pressing portion to an other side opposite to the one side in the one direction, the tread portion includes a tread that has a tread protruding shape bulging to the one side in the one direction and that is to be depressed by the driver from the one side in the one direction, the tread portion being placed on the one side in the one direction with respect to the pedal effort transmission member, the pedal effort transmission member includes one surface having a transmission member protruding shape bulging to the one side in the one direction and directed to the one side in the one direction, the one surface is in contact with the tread portion from the other side in the one direction, and a top of the tread protruding shape and a top of the transmission member protruding shape overlap with the load sensor on the one side in the one direction.

12. The pedal device according to claim 11, wherein the top of the tread protruding shape is flat.

* * * * *